United States Patent
Egami et al.

(10) Patent No.: US 8,046,123 B2
(45) Date of Patent: Oct. 25, 2011

(54) CONTROL APPARATUS FOR ELECTRIC VEHICLES

(75) Inventors: Tsuneyuki Egami, Gamagori (JP); Keiichi Kawakami, Anjo (JP); Takashi Ogawa, Kariya (JP)

(73) Assignee: Denso Corporation, Kariya (JP)

( * ) Notice: Subject to any disclaimer, the term of this patent is extended or adjusted under 35 U.S.C. 154(b) by 1206 days.

(21) Appl. No.: 11/643,980

(22) Filed: Dec. 22, 2006

(65) Prior Publication Data

US 2007/0145927 A1 Jun. 28, 2007

(30) Foreign Application Priority Data

Dec. 26, 2005 (JP) ................................. 2005-372966
Feb. 7, 2006 (JP) ................................. 2006-029810
Nov. 14, 2006 (JP) ................................. 2006-308135
Nov. 15, 2006 (JP) ................................. 2006-309072

(51) Int. Cl.
*B60L 9/00* (2006.01)
*B60L 11/00* (2006.01)
*G06F 19/00* (2011.01)
*G06G 7/70* (2006.01)

(52) U.S. Cl. ................. 701/22; 701/1; 701/99; 701/101
(58) Field of Classification Search ...... 700/22; 318/432
See application file for complete search history.

(56) References Cited

U.S. PATENT DOCUMENTS

| | | | |
|---|---|---|---|
| 5,661,380 A * | 8/1997 | Obara et al. .................. 318/139 |
| 7,099,756 B2 | 8/2006 | Sato | |
| 7,212,891 B2 | 5/2007 | Sato | |
| 7,443,117 B2 * | 10/2008 | Egami et al. .................. 318/139 |
| 7,586,278 B2 * | 9/2009 | Egami et al. .................. 318/432 |
| 7,609,023 B2 * | 10/2009 | Egami et al. .................. 318/801 |
| 7,615,943 B2 * | 11/2009 | Egami et al. .................. 318/139 |
| 7,653,466 B2 * | 1/2010 | Egami et al. ..................... 701/22 |
| 2002/0110007 A1 | 8/2002 | Kalman et al. | |
| 2004/0145338 A1 | 7/2004 | Nakamura et al. | |
| 2004/0145356 A1 | 7/2004 | Kalman et al. | |
| 2006/0052915 A1 | 3/2006 | Sato | |
| 2006/0247829 A1 | 11/2006 | Sato | |

(Continued)

FOREIGN PATENT DOCUMENTS

EP 1000796 A2 5/2000

(Continued)

OTHER PUBLICATIONS

U.S. Appl. No. 11/606,060, filed Nov. 30, 2006.

(Continued)

*Primary Examiner* — Khoi Tran
*Assistant Examiner* — Ian Jen
(74) *Attorney, Agent, or Firm* — Nixon & Vanderhye P.C.

(57) ABSTRACT

In an electric vehicle having a plurality of MG units each including an AC motor and an inverter, a control apparatus executes system voltage stabilization control to suppress variations in a system voltage by adjusting an input power of a first MG unit or a second MG unit so as to reduce the difference between a target value and detected value of the system voltage. In execution of this control, either one or both of the MG units is selected by a selector by using information on the first MG unit and the second MG unit. The system voltage stabilization control is executed on the selected MG unit. Alternatively, the control apparatus may execute the system voltage stabilization control by selecting a voltage boosting converter.

28 Claims, 14 Drawing Sheets

U.S. PATENT DOCUMENTS

| | | |
|---|---|---|
| 2007/0119634 A1 | 5/2007 | Egami et al. |
| 2007/0125582 A1 | 6/2007 | Egami et al. |
| 2007/0126385 A1 | 6/2007 | Egami et al. |
| 2007/0145926 A1 | 6/2007 | Egami et al. |
| 2007/0145927 A1 | 6/2007 | Egami et al. |
| 2007/0194763 A1 | 8/2007 | Egami et al. |
| 2008/0067960 A1* | 3/2008 | Maeda et al. ............ 318/400.02 |
| 2008/0067973 A1* | 3/2008 | Ishikawa et al. .............. 320/104 |
| 2008/0086255 A1* | 4/2008 | Oshima et al. ................ 701/101 |
| 2008/0122393 A1* | 5/2008 | Negoro et al. ................ 318/552 |
| 2008/0234096 A1* | 9/2008 | Joshi et al. ........................ 477/3 |

FOREIGN PATENT DOCUMENTS

| | | |
|---|---|---|
| EP | 1 460 756 A1 | 9/2004 |
| EP | 1603224 A | 12/2005 |
| EP | 1 800 934 A2 | 6/2007 |
| EP | 1 800 936 A2 | 6/2007 |
| JP | 2002-223590 | 8/2002 |
| JP | 2003-259505 | 9/2003 |
| JP | 2003-259689 | 9/2003 |
| JP | 2003-309997 | 10/2003 |
| JP | 2004-072892 | 3/2004 |
| JP | 2004-260904 | 9/2004 |
| JP | 2004-282886 | 10/2004 |
| JP | 2005-176569 | 6/2005 |

OTHER PUBLICATIONS

U.S. Appl. No. 11/606,061, filed Nov. 30, 2006.
U.S. Appl. No. 11/605,456, filed Nov. 29, 2006.
U.S. Appl. No. 11/640,407, filed Dec. 18, 2007.
U.S. Appl. No. 11/653,848, filed Jan. 17, 2007.
U.S. Appl. No. 11/707,903, filed Feb. 20, 2007.
U.S. Appl. No. 11/950,768, filed Dec. 5, 2007 (unpublished).
U.S. Appl. No. 12/068,595, filed Feb. 8, 2008 (unpublished).
Extended EP Search Report dated Mar. 12, 2007.
Extended EP Search Report dated Feb. 28, 2007.
EPO Search/Examination Report dated Jul. 18, 2007 in European Application No. 07103332.8.
Examination Report dated Aug. 4, 2008 in EP 06 125 077.5.
U.S. Appl. No. 11/605,456, filed Nov. 2006, Egami et al.
U.S. Appl. No. 11/606,061, filed Nov. 2006, Egami et al.
U.S. Appl. No. 11/606,060, filed Nov. 2006, Egami et al.
Office Action (4 pgs.) dated Oct. 29, 2010 issued in corresponding Japanese Application No. 2006-308135 with an at least partial English-language translation thereof (2 pgs.).

* cited by examiner

CONTROL APPARATUS FOR ELECTRIC VEHICLES

CROSS REFERENCE TO RELATED APPLICATION

This application is based on and incorporates herein by reference Japanese Patent Applications No. 2005-372966 filed on Dec. 26, 2005, No. 2006-29810 filed on Feb. 7, 2006, No. 2006-308135 filed on November 14 and No. 2006-309072 filed on November 15.

This application is related to five US patent applications (IPICS 99951-US, 100145-US, 100223-US, 100725-US, 101862-US and 103382-US) claiming priorities to the following Japanese Patent Applications, respectively:
No. 2005-343750 filed on Nov. 29, 2005;
No. 2005-353075 filed on Dec. 7, 2005;
No. 2005-353076 filed on Dec. 7, 2005;
No. 2005-371264 filed on Dec. 26, 2005;
No. 2006-40272 filed on Feb. 17, 2006; and
No. 2006-89713 filed on Mar. 29, 2006.

FIELD OF THE INVENTION

The present invention relates to a control apparatus for an electric vehicle including a system for converting a voltage generated by a DC power supply into a system voltage by using a voltage converter and for driving an AC motor by applying the system voltage to the AC motor through an inverter.

BACKGROUND OF THE INVENTION

As disclosed in documents such as U.S. 2006/0052915A1 (JP 2004-274945A), in an electric vehicle having AC motors mounted therein to serve as a power source of the vehicle, the AC motors are each capable of serving as a motor for driving wheels of the vehicle as well as a generator driven by the engine to generate power. As the above system, a control apparatus for the electric vehicle includes a voltage boosting converter for raising a voltage supplied by a DC power supply, which is implemented by a secondary battery, to a high DC voltage appearing on a power supply line connected to AC motors through inverters. The inverters are capable of serving as a component for converting the raised DC voltage appearing on the power supply line into an AC voltage for driving one of the AC motors as well as a component for converting the AC voltage into a DC voltage supplied back or restored to the secondary battery through the voltage boosting converter, which lowers the level of the DC voltage.

In the above system, to stabilize the voltage appearing on the power supply line, the voltage boosting converter controls the voltage appearing on the power supply line to a target voltage. Further, at the same time, a smoothing capacitor connected to the power supply line smoothes the voltage appearing on the power supply line.

When a relation between electric power driving one of the AC motors and electric power generated by the other AC motor considerably varies due to a change in vehicle operating state or another reason, however, voltage variations caused by a change in such relation as voltage variations of the power supply line cannot be absorbed by the voltage boosting converter and/or the smoothing capacitor. Thus, the voltage appearing on the power supply line becomes excessively high. As a result, it is likely that electronic equipment connected to the power supply line is damaged. To cope with this problem, there is provided a method for enhancing the effect of stabilizing the voltage appearing on the power supply line by using an improved voltage boosting converter with better performance and a smoothing capacitor with a larger capacitance. By adoption of this method, however, the voltage boosting converter with better performance and the smoothing capacitor with a larger capacitance will inevitably raise the cost of the control apparatus for an electric vehicle. Thus, demands for a system having a small size and a low cost cannot be met. The above relation between the power driving one of the AC motors and the power generated by the other AC motor is also referred to as a balance of power between the power driving one of the AC motors and the power generated by the other AC motor.

It is proposed for controlling the inverter to make a sum of energies (or the balance of electric power) of the two AC motors equal to 0 at the time the connection between the DC power supply and the voltage boosting converter is cut off by using a relay in the event of a failure occurring in the DC power supply. However, this method is provided as a countermeasure to a failure occurring in the DC power supply and is capable of enhancing the effect of stabilizing the voltage appearing on the power supply line in a normal state of the power supply. In addition, even if an attempt is made to control the inverter to make a sum of energies (or the balance of power) of the two AC motors equal to 0 in a normal state, it is difficult to control the inverter to make the sum of energies (or the balance of power) of the two AC motors equal to 0 in the following cases.

In the first place, one of the AC motors is linked to a driving shaft of the electric vehicle and the other AC motor is linked to an output shaft of the internal combustion engine, that is, the two AC motors are linked to members having different operations. In the second place, the effect of a processing delay of the control executed on the inverter becomes larger, for example, during a transient condition in which the operating state of the electric vehicle changes. The AC motor linked to the internal combustion engine is not capable of obviating power variations caused by changes of a torque generated by the internal combustion engine. This fact makes it even more difficult to control the inverter to make the sum of energies of the two AC motors equal to 0.

SUMMARY OF THE INVENTION

It is thus an object of the present invention to improve a control apparatus for electric vehicles to be capable of stabilizing a voltage appearing on a power supply line in small size and low cost.

According to one aspect of the present invention, a control apparatus for an electric vehicle comprises a voltage converter, a plurality of motor driving units (MG-units), a MG-unit selector and a system voltage control unit. The voltage converter converts a voltage generated by a DC power supply into a system voltage appearing on a power supply line. The MG units each include an inverter connected to the power supply line and an AC motor driven by the inverter. The MG-unit selector selects one or more MG units in accordance with the operating state of the electric vehicle. The system voltage control unit executes system voltage stabilization control to suppress variations in the system voltage by controlling input powers of the selected MG units.

With this configuration, variations in the system voltage can be suppressed by adjusting the input powers of selected MG units in execution of the control to stabilize the system voltage. Thus, even when balance of power between the AC motors changes considerably due to a change in vehicle operating state or another cause, the system voltage, that is, the voltage appearing on the power supply line, can be stabilized effectively. In addition, the effect of the stabilization of the voltage appearing on the power supply line can be enhanced without using a voltage converter having high performance and without employing a smoothing capacitor having a large capacitance. Thus, demands for a compact system and a low cost can be met.

When the driving state and power generation state of each MG unit (or each AC motor) change due to a variation of the operating state of the electric vehicle, the upper limit of the input power operation quantity of the MG unit, that is, the allowable upper limit value of the input power of each MG unit, also changes. Thus, when the control apparatus executes the system voltage stabilization control to always adjust the input power of the same MG unit, that is, a configuration for executing control to stabilize the system voltage by always adjusting the input power of the same MG unit, depending on the operating state of the electric vehicle, the upper limit of the input power operation quantity of the MG unit serving as the object of the control to stabilize the system voltage may become smaller than a target input power operation quantity required for stabilization of the system voltage. In such a condition, the target input power operation quantity required for stabilization of the system voltage cannot be realized so that it is quite possible that the system voltage can no longer be stabilized sufficiently.

For this reason, the MG-unit selector selects one or more MG units in accordance with the operating state of the electric vehicle, whereas the system voltage control unit executes the system voltage stabilization control to suppress variations in the above system voltage by controlling the input powers of the selected MG units. Thus, when the state of driving the MG units and/or the state of power generation in the MG units change due to a variation of the operating state of the electric vehicle so that the upper limit of the input power operation quantity of each MG unit also changes, the MG-unit selector selects the above MG units by which the target input power operation quantity required for stabilization of the system voltage can be realized. Then, by executing the control to stabilize the system voltage on one selected MG unit or, as an alternative, by letting the two or more selected MG units share the control load of the control to stabilize the system voltage, the target input power operation quantity required for stabilization of the system voltage can be realized certainly. Thus, the system voltage stabilization function can be executed fully without being affected by the operating state of the electric vehicle.

According to another aspect of the present invention, a control apparatus for an electric vehicle comprises a voltage converter, a plurality of motor driving units (MG-units), a MG-unit selector and a system voltage control unit. The voltage converter converts a voltage generated by a DC power supply into a system voltage appearing on a power supply line. The MG unit includes an inverter connected to the power supply line and an AC motor driven by the inverter. The selector selects one or more the MG units and the voltage converter in accordance with the operating state of the electric vehicle. The system voltage control unit executes system voltage stabilization control to suppress variations in the system voltage by controlling powers handled by the selected MG units and/or the voltage converter.

With this configuration, variations in the system voltage can be suppressed by adjusting the power handled by a selected MG unit or selected MG units and/or the voltage converter in execution of the control to stabilize the system voltage. Thus, even when balance of power between the AC motors changes considerably due to a change in vehicle operating state or another cause, the system voltage (that is, the voltage appearing on the power supply line) can be stabilized effectively. In addition, the effect of the stabilization of the voltage appearing on the power supply line can be enhanced without using the voltage converter having high performance and without employing a smoothing capacitor having a large capacitance. Thus, demands for a compact system and a low cost can be met.

When the driving state and power generation state of each MG unit change due to a variation of the operating state of the electric vehicle, an upper limit of the power operation quantity of the MG unit, that is, the allowable upper limit value of the power of each MG unit, also changes. Thus, when the control apparatus executes the system voltage stabilization control to always adjust the input power of the same MG unit, that is, executes control to stabilize the system voltage by always adjusting the input power of the same MG unit, depending on the operating state of the electric vehicle, the upper limit of the power operation quantity of the MG unit serving as the object of the control to stabilize the system voltage may become smaller than a target power operation quantity required for stabilization of the system voltage. In such a condition, the power operation quantity required for stabilization of the system voltage cannot be realized so that the system voltage can no longer be stabilized sufficiently.

For this reason, the selector selects one or more the MG units and/or the voltage converter in accordance with the operating state of the electric vehicle, whereas the system voltage control unit executes the system voltage stabilization control to suppress variations in the system voltage by controlling powers handled by the selected MG units and/or the voltage converter. Thus, when the state of driving the MG units (or the state of power generation in the MG units) and/or the state of driving the voltage converter change due to a variation of the operating state of the electric vehicle so that the upper limit of the input power operation quantity of each MG unit also changes, the selector selects the above MG units and/or the voltage converter so that the selected MG units and/or the selected voltage converter can be used to realize the target input power operation quantity required for stabilization of the system voltage. Then, by executing the control to stabilize the system voltage on one selected MG unit or the selected voltage converter or, as an alternative, by letting the two or more selected MG units and/or the voltage converter share control load of the control to stabilize the system voltage, the target input power operation quantity required for stabilization of the system voltage can be realized certainly. Thus, the system voltage stabilization function can be executed fully without being affected by the operating state of the electric vehicle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE INVENTION

First Embodiment

Figure 1:
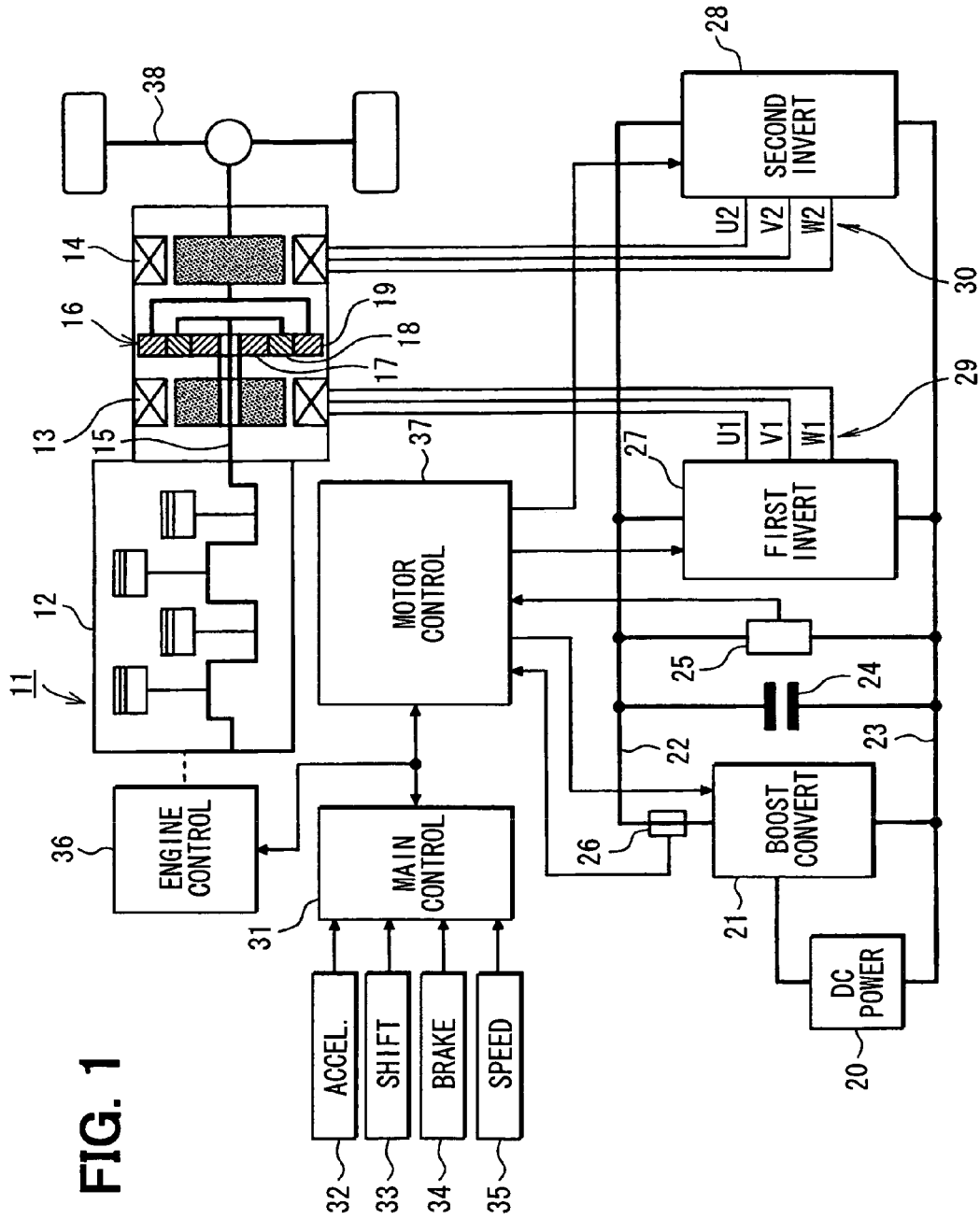
FIG. 1 is a block diagram showing a system for driving an electric vehicle in accordance with a first embodiment of the present invention.

Referring first to FIG. 1, an electric vehicle 11 has an internal combustion engine 12 in addition to a first AC motor 13 and a second AC motor 14. Thus, the electric vehicle 11 is an engine/motor hybrid vehicle. The engine 12 and the second AC motor 14 are employed as a drive power source for driving the electric vehicle 11. Power generated by a crankshaft 15 of the engine 12 is divided into two paths by a planetary gear set 16. The planetary gear set 16 includes a sun gear 17, a planetary gear 18 and a ring gear 19. The sun gear 17 rotates at the center. The planetary gear 18 rotates along a circumference external to the sun gear 17 while revolving around the center of its own. The ring gear 19 rotates along a circumference external to the planetary gear 18. The planetary gear 18 is linked to the crankshaft 15 of the engine 12 through a carrier not shown in the figure. On the other hand, the ring gear 19 is linked to a rotation shaft of the second AC motor 14. The sun gear 17 is linked to the first AC motor 13.

A secondary battery serving as a DC power supply 20 is connected to a voltage boosting converter 21 serving as a power conversion means. The voltage boosting converter 21 is a component having a function for increasing a DC voltage output by the DC power supply 20 to generate a DC system voltage supplied between a power supply line 22 and a ground line 23 as well as a function for decreasing the system voltage to return or restore power to the DC power supply 20. A smoothing capacitor 24 for smoothing the system voltage and a voltage sensor 25 serving as a voltage detection means for detecting a value of the system voltage are connected between the power supply line 22 and the ground line 23. A current sensor 26 serving as a current detection means is placed on the power supply line 22 as a means for detecting a current flowing through the power supply line 22.

In addition, a three-phase first inverter 27 and a three-phase second inverter 28 are also connected between the power supply line 22 and the ground line 23. The three-phase first inverter 27 and the three-phase second inverter 28 are each a three-phase inverter of a voltage control type. The three-phase first inverter 27 drives the first AC motor 13, whereas the three-phase second inverter 28 drives the second AC motor 14. The three-phase first inverter 27 and the first AC motor 13 form a first motor driving unit 29, which is also referred to as a first MG unit 29. Similarly, the three-phase second inverter 28 and the second AC motor 14 form a second motor driving unit 30, which is also referred to as a second MG unit 30.

A main control unit 31 is a computer for executing overall control on the electric vehicle as a whole. The main control unit 31 acquires signals output by a variety of sensors and switches to detect an operating state of the electric vehicle. The sensors and the switches include an accelerator sensor 32, a shift switch 33, a brake switch 34 and a vehicle speed sensor 35. The accelerator sensor 32 is a sensor for detecting an acceleration operation quantity representing an operation quantity of an acceleration pedal. The shift switch 33 is a sensor for detecting the position of a gear shift operation of the electric vehicle. The position of the shift operation can be a parking position (P), a rear driving position (R), a neutral position (N) or a forward driving position (D). The brake switch 34 is a switch for detecting a braking operation. The vehicle speed sensor 35 is a sensor for detecting a value of the speed of the electric vehicle. The main control unit 31 exchanges control and data signals with an engine control unit 36 and a motor control unit 37, driving the engine control unit 36 and the motor control unit 37 to control the engine 12, the first AC motor 13 and the second AC motor 14 in accordance with the operating state of the electric vehicle. The engine control unit 36 is for controlling the operation of the engine 12, whereas the motor control unit 37 is for controlling the operations of the first AC motor 13 and the second AC motor 14.

Figure 2:
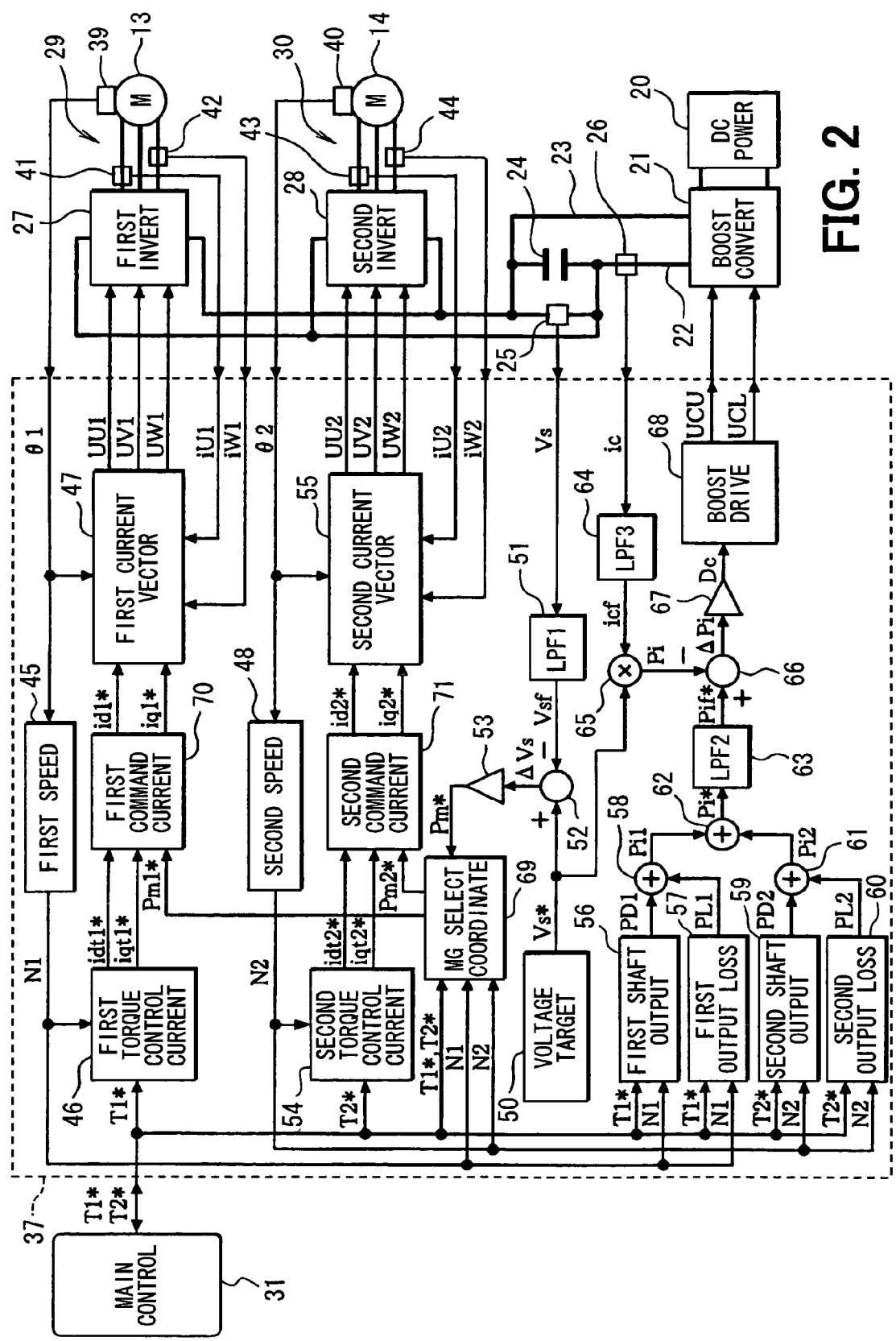
FIG. 2 is a block diagram showing a system for controlling AC motors in accordance with the first embodiment.

Next, control of the first AC motor 13 and the second AC motor 14 is described by referring to FIG. 2. The first AC motor 13 and the second AC motor 14 are each a three-phase permanent-magnet synchronous motor having a built-in permanent magnet. The first AC motor 13 and the second AC motor 14 have respectively rotor rotational position sensors 39 and 40 each used for detecting the rotational position of the rotor of the motor. On the basis of three-phase voltage command signals UU1, UV1 and UW1 output by the motor control unit 37, the first inverter 27 of the voltage control type converts a DC voltage appearing on the power supply line 22 into three-phase AC voltages U1, V1 and W1 for driving the first AC motor 13. The DC voltage appearing on the power supply line 22 is a system voltage generated by the voltage boosting converter 21. A U-phase current sensor 41 is a sensor for detecting a U-phase current iU1 of the first AC motor 13, whereas a W-phase current sensor 42 is a sensor for detecting a W-phase current iW1 of the first AC motor 13.

Similarly, on the basis of three-phase voltage command signals UU2, UV2 and UW2 output by the motor control unit 37, the three-phase second inverter 28 of the voltage control type converts the DC voltage appearing on the power supply line 22 into three-phase AC voltages U2, V2 and W2 for driving the second AC motor 14. A U-phase current sensor 43 is a sensor for detecting a U-phase current iU2 of the second AC motor 14, whereas a W-phase current sensor 44 is a sensor for detecting a W-phase current iW2 of the first AC motor 13.

It is to be noted that the first AC motor 13 and the second AC motor 14 each also function as a generator, when the first AC motor 13 and the second AC motor 14 are driven by the three-phase first inverter 27 and the three-phase second inverter 28 respectively to generate a negative torque. For example, when the electric vehicle 11 is being decelerated, AC power generated by the second AC motor 14 as a deceleration energy is converted into DC power by the three-phase second inverter 28 and the DC power is accumulated back in the DC power supply 20. Normally, a portion of power of the engine 12 is transferred to the first AC motor 13 by way of the planetary gear 18, causing the first AC motor 13 to operate as a generator for generating electric power corresponding to the portion of the power of the engine 12. The electric power generated by the first AC motor 13 is supplied to the second AC motor 14, causing the second AC motor 14 to operate as a motor. The power of the engine 12 is divided into two paths by the planetary gear set 16. When a torque propagated to the ring gear 19 of the planetary gear set 16 is greater than a torque required by a running operation of the electric vehicle, the first AC motor 13 functions as a motor, drawing power for the engine 12. In this case, the second AC motor 14 functions as a generator generating power to be supplied to the first AC motor 13. Thus, each of the first AC motor 13 and the second AC motor 14 operates as a motor/generator (MG).

In execution of torque control on the first AC motor 13, the motor control unit 37 generates the three-phase voltage command signals UU1, UV1 and UW1 by a sinusoidal-waveform PWM control method on the basis of a torque command value T1* output by the main control unit 31, the U-phase current iU1 and W-phase current iW1 of the first AC motor 13 as well as the rotor rotational position $\theta 1$ of the first AC motor 13 as described below. As described above, the U-phase current iU1 and the W-phase current iW1 are signals output by the current sensors 41 and 42 respectively, whereas the rotor rotational position $\theta 1$ is a signal output by a rotor rotational position sensor 39.

In the motor control unit 37, a signal output by the rotor rotational position sensor 39 as a signal representing the rotor rotational position $\theta 1$ of the first AC motor 13 is supplied to a first rotation speed computation unit 45 for computing a rotation speed N1 of the first AC motor 13 on the basis of the rotor rotational position $\theta 1$. Then, to execute feedback control on a d-axis current id1 and a q-axis current iq1 independently of each other in a d-q coordinate system set as a rotational coordinate system for the rotor in the first AC motor 13, a first torque control current computation unit 46 computes a first torque control current vector it1*, which includes a d-axis torque control current idt1* and a q-axis torque control current iqt1*, according to a torque command value T1* and rotation speed N1 of the first AC motor 13 by using map data, a mathematical equation or the like. The first torque control current computation unit 46 supplies the first torque control current vector idt1* to a first command current computation unit 70 for computing a final first command current vector i1*, which includes a d-axis command current id1* and a q-axis command current iq1*, by a method to be described later.

Then, a first current vector control unit 47 computes an actual current vector i1, which includes an actual d-axis current id1 and an actual q-axis current iq1, on the basis of a signal output by a current sensor 41 as a signal representing a U-phase current iU1 of the first AC motor 13, a signal output by a current sensor 42 as a signal representing a W-phase current iW1 of the first AC motor 13 and a signal output by the rotor rotational position sensor 39 as a signal representing a rotor rotational position $\theta 1$ of the first AC motor 13. Then, by execution of P-I control, the first current vector control unit 47 computes a d-axis command voltage Vd1* so as to reduce a d-axis difference $\Delta id1$ between the d-axis command current id1* and an actual d-axis current id1 and, in the same way, by execution of P-I control, the first current vector control unit 47 computes q-axis command voltage Vq1* so as to reduce a q-axis difference $\Delta iq1$ between the q-axis command current iq1* and the actual q-axis current iq1. Subsequently, the first current vector control unit 47 converts the d-axis command voltage Vd1* and the q-axis command voltage Vq1* into three-phase voltage command signals UU1, UV1 and UW1, supplying these three-phase voltage command signals UU1, UV1 and UW1 to a three-phase first inverter 27.

In execution of torque control on the second AC motor 14, on the other hand, the motor control unit 37 generates the three-phase voltage command signals UU2, UV2 and UW2 by the sinusoidal-waveform PWM control method on the basis of a torque command value T2* output by the main control unit 31, the U-phase current iU2 and W-phase current iW2 of the second AC motor 14 as well as the rotor rotational position $\theta 2$ of the second AC motor 14. As described below, the U-phase current iU1 and the W-phase current iW1 are signals output by the current sensors 43 and 44 respectively, whereas the rotor rotational position $\theta 2$ is a signal output by the rotor rotational position sensor 40.

A signal output by the rotor rotational position sensor 40 as a signal representing the rotor rotational position $\theta 2$ of the second AC motor 14 is supplied to a second rotation speed computation unit 48 for computing a rotation speed N2 of the second AC motor 14 on the basis of the rotor rotational position $\theta 2$. Then, to execute feedback control of a d-axis current id2 and a q-axis current iq2 independently of each other in the d-q coordinate system set as a rotational coordinate system for the rotor in the smoothing capacitor 24, a second torque control current computation unit 54 computes a second torque control current vector it2*, which includes a d-axis torque control current idt2* and a q-axis torque control current iqt2*, according to the torque command value T2* and rotation speed N2 of the second AC motor 14 by using map data, a mathematical equation or the like. The second torque control current computation unit 54 supplies the second torque control current vector it2* to a second command current computation unit 71 for computing a final second command current vector i2*, which includes a d-axis command current id2* and a q-axis command current iq2*, by a method to be described later.

Then, a second current vector control unit 55 computes an actual current vector i2, which includes an actual d-axis current id2 and an actual q-axis current iq2, on the basis of a signal output by the current sensor 43 as a signal representing a U-phase current iU2 of the second AC motor 14, of a signal output by the current sensor 44 as a signal representing a W-phase current iW2 of the second AC motor 14 and of a signal output by a rotor rotational position sensor 40 as a signal representing a rotor rotational position $\theta 2$ of the second AC motor 14. Then, by execution of P-I control, the second current vector control unit 55 computes a d-axis command voltage Vd2* so as to reduce a d-axis difference $\Delta id2$ between the d-axis command current id2* and an actual d-axis current id2. In the same way, by execution of P-I control, the second current vector control unit 55 computes a q-axis command voltage Vq2* so as to reduce a q-axis difference $\Delta iq2$ between the q-axis command current iq2* and the actual q-axis current iq2. Subsequently, the second current vector control unit 55 converts the d-axis command voltage Vd2* and the q-axis command voltage Vq2* into three-phase voltage command signals UU2, UV2 and UW2, supplying these three-phase voltage command signals UU2, UV2 and UW2 to the three-phase second inverter 28.

In addition, the motor control apparatus 37 adjusts the current vector to change only an input power different from a power required for generating a torque in the first AC motor 13 or the second AC motor 14, that is, to change only a reactive power. In this way, it is possible to execute the system voltage stabilization control to suppress variations in the system voltage by adjusting the input powers of the first AC motor 13 and the second AC motor 14 while sustaining the torque generated in the first AC motor 13 at a constant value, that is, the torque command value T1*, and sustaining the torque generated in the second AC motor 14 at a constant value, that is, the torque command value T2*.

At that time, the motor control apparatus 37 uses information on the first MG unit 29 and the second MG unit 30 as information on the operating state of the electric vehicle to select one of the first MG unit 29 and the second MG unit 30 or both of them, executing the control to stabilize the system voltage on the selected MG units. Typical information on the first MG unit 29 includes the torque command value, rotation speed and temperature of the first AC motor 13, whereas typical information on the second MG unit 30 includes the torque command value, rotation speed and temperature of the second AC motor 14.

The torque command value and rotation speed of the first AC motor 13 have correlation with the driving state and power generation state of the first MG unit 29. Similarly, the torque command value of the second AC motor 14 and the rotation speed of the second AC motor 14 have correlation with the driving state and power generation state of the second MG unit 30. Since the upper limit of the input power operation quantity of the first MG unit 29, that is, the allowable upper limit value of the input power of the first MG unit 29, changes, because the driving state and power generation state of the first MG unit 29 change, the torque command value and rotation speed of the first AC motor 13 serve as information usable to determine the upper limit of the input power operation quantity of the first MG unit 29 precisely. Similarly, since the upper limit of the input power operation quantity of the second MG unit 30, that is, the allowable upper limit value of the input power of the second MG unit 30, changes because the driving state and power generation state of the second MG unit 30 change, the torque command value and rotation speed of the second AC motor 14 serve as information usable to determine the upper limit of the input power operation quantity of the second MG unit 30 precisely.

Thus, when the torque command value and rotation speed of the first AC motor 13 are used in a process to select the first MG unit 29 and/or the second MG unit 30 each to serve as an object of the control to stabilize the system voltage, in the process, it is possible to compute the upper limit of the input power operation quantity of the first MG unit 29 precisely and, hence, correctly select the first MG unit 29 on the basis of the upper limit of its input power operation quantity. Similarly, when the torque command value and rotation speed of the second AC motor 14 are used in a process to select the first MG unit 29 and/or the second MG unit 30 each to serve as an object of the control to stabilize the system voltage, in the process, it is possible to compute the upper limit of the input power operation quantity of the second MG unit 30 precisely and, hence, correctly select the second MG unit 30 on the basis of the upper limit of its input power operation quantity. As a result, it is possible to select the first MG unit 29 and/or the second MG unit 30 by which the target input power operation quantity Pm* required for the control to stabilize the system voltage can be implemented by assuring that the target input power operation quantity Pm* is smaller than the upper limit of the input power operation quantity of the selected MG unit.

In addition, since a first heat margin hc1 (defined as a maximum of an allowable heat dissipation quantity not causing an overheated state) of the first MG unit 29 changes in accordance with the temperature of a winding in the first AC motor 13, when information on temperatures (such as the temperature of the winding) of the first AC motor 13 is used in a process to select the first MG unit 29 and/or the second MG unit 30 each to serve as an object of the control to stabilize the system voltage, in the process, it is possible to compute the first heat margin hc1 of the first MG unit 29 precisely and, hence, correctly select the first MG unit 29 due to the fact that the first MG unit 20 has the first heat margin hc1 greater than that of the second MG unit 30. Similarly, since a second heat margin hc2 of the second MG unit 30 also changes in accordance with the temperature of a winding in the second AC motor 14, when information on temperatures (such as the temperature of the winding) of the second AC motor 14 is used in a process to select the first MG unit 29 and/or the second MG unit 30 each to serve as an object of the control to stabilize the system voltage, in the process, it is possible to compute the second heat margin hc2 of the second MG unit 30 precisely and, hence, correctly select the second MG unit 30 due to the fact that the second MG unit 30 has the second heat margin hc2 greater than the first heat margin hc1 of the first MG unit 29.

Specifically, first of all, a system voltage target value computation unit 50 serving as a target voltage computation means computes a target value Vs* of the system voltage. A value detected by the voltage sensor 25 as a detected value Vs of the system voltage is supplied to a first low pass filter 51 serving as a first low frequency passing means for carrying a low pass filtering process to pass only low frequency components of the detected voltage Vs. Then, a subtractor 52 computes a difference ΔVs between the target value Vs* of the system voltage and a detected value Vsf representing the low frequency components passed by the first low pass filter 51 in the low pass filtering process carried out on the system voltage. The subtractor 52 then supplies the difference ΔVs to a P-I controller 53 serving as a power operation quantity computation means for computing a target input power operation quantity Pm* reducing the difference ΔVs between the target value Vs* of the system voltage and a detected value Vsf representing the low frequency components passed by the first low pass filter 51 in the low pass filtering process by execution of P-I control.

Figure 3:
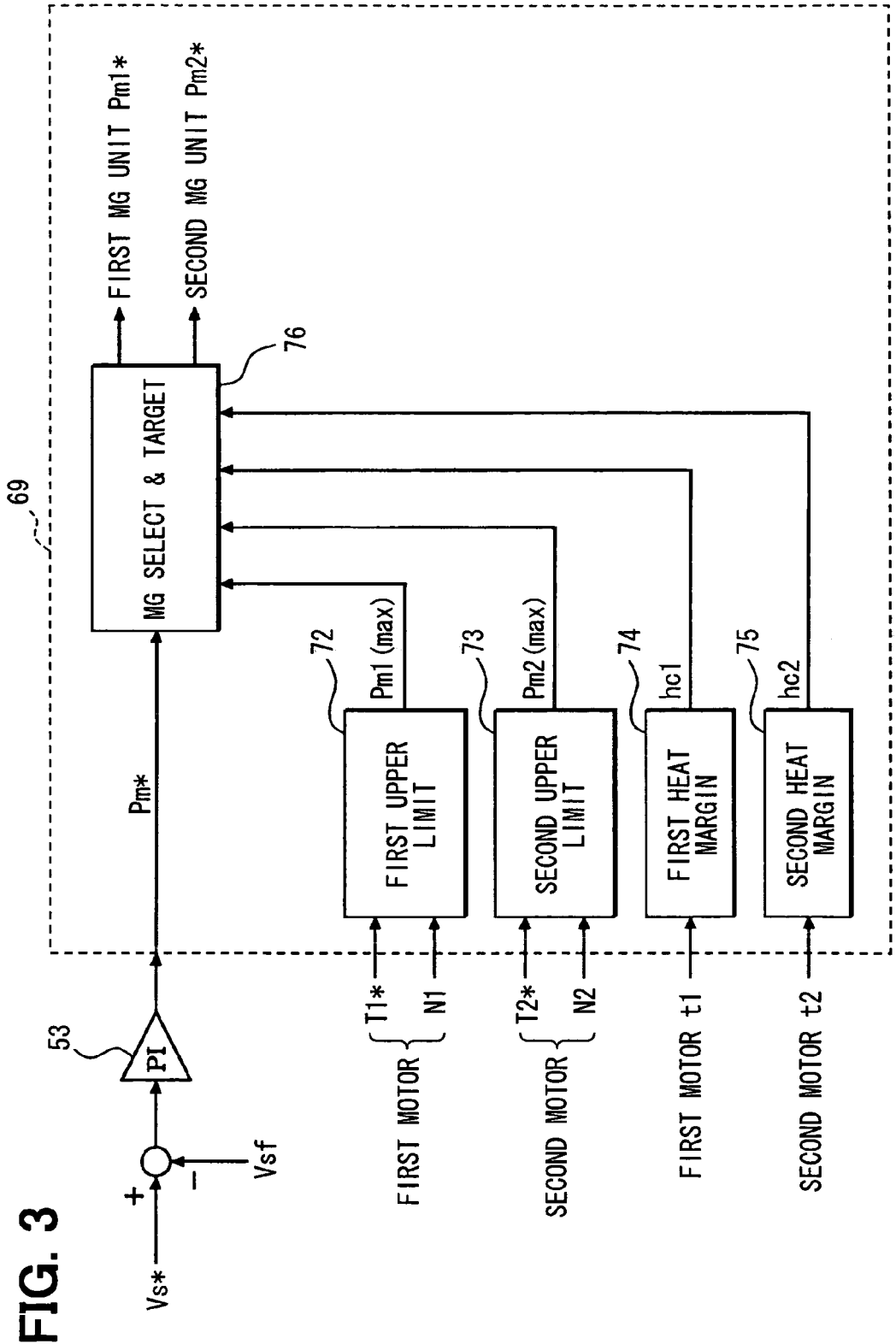
FIG. 3 is a block diagram showing a unit for executing coordination control to select MG units.

Then, an MG select coordination control unit 69 functioning as the MG-unit select means selects an MG unit, which is to serve as an object of the control to stabilize the system voltage, as follows. As shown in FIG. 3, the torque command value T1* and rotation speed N1 of the first AC motor 13 are supplied to a first input power operation quantity upper limit computation unit 72 for computing a first upper limit value Pm1(max) of the first MG unit 29 by using map data, a mathematical equation or the like. At the same time, the torque command value T2* and rotation speed N2 of the second AC motor 14 are supplied to a second input power operation quantity upper limit computation unit 73 for computing a second upper limit value Pm2(max) of the second MG unit 30 by using map data, a mathematical equation or the like.

In addition, a temperature to detected by a first temperature sensor (not shown) as a temperature typically representing the temperature of a winding in the first AC motor 13 is supplied to a first heat margin computation unit 74 for computing the first heat margin hc1 of the first MG unit 29 by using map data, a mathematical equation or the like. At the same time, a temperature t2 detected by a second temperature sensor (not shown) as a temperature typically representing the temperature of a winding in the second AC motor 14 is supplied to a second heat margin computation unit 75 for computing the second heat margin hc2 of the second MG unit 30 by using map data, a mathematical equation or the like. It is to be noted that the temperature t0 of the first AC motor 13 can also be estimated on the basis of information on the first AC motor 13. The information includes the operating state of the first AC motor 13, the temperature of the atmosphere and the intake-air temperature. Similarly, the temperature t2 of the second AC motor 14 can also be estimated on the basis of information on the second AC motor 14. The information includes the operating state of the second AC motor 14, the temperature of the atmosphere and the intake-air temperature.

Then, a MG selection and target input power operation quantity computation unit 76 compares the target input power operation quantity Pm* with the first limit value Pm1(max) of the first MG unit 29 and with the second limit value Pm2(max) of the second MG unit 30 to produce a determination result as to whether or not the target input power operation quantity Pm* is greater than the first limit value Pm1(max) and a determination result as to whether or not the target input power operation quantity Pm* is greater than the second limit value Pm2(max). In addition, the MG selection and target input power operation quantity computation unit 76 also compares the first heat margin hc1 with the second heat margin hc2 to produce a determination result as to whether or not the first heat margin hc1 is greater than the second heat margin hc2.

When both the first limit value Pm1(max) of the first MG unit 29 and the second limit value Pm2(max) of the second MG unit 30 are greater than the target input power operation quantity Pm*, the target input power operation quantity Pm* can be implemented by selecting either of the first MG unit 29 and the second MG unit 30. Thus, an MG unit having a heat margin hc greater than the heat margin hc of the other MG unit can be selected as an MG unit to serve as an object of the control to stabilize the system voltage. In this case, the target input power operation quantity of the selected MG unit is set at the target input power operation quantity Pm*.

When only one of the first limit value Pm1(max) of the first MG unit 29 and the second limit value Pm2(max) of the second MG unit 30 is greater than the target input power operation quantity Pm*, on the other hand, the target input power operation quantity Pm* can be implemented by selecting the MG unit with an input power operation quantity upper limit value Pm(max) greater than the target input power operation quantity Pm*. In this case, the MG unit with an input power operation quantity upper limit value Pm(max) greater than the target input power operation quantity Pm* is selected as an MG unit to serve as an object of the control to stabilize the system voltage, and the target input power operation quantity of the selected MG unit is set at the target input power operation quantity Pm*.

When both the first limit value Pm1(max) of the first MG unit 29 and the second limit value Pm2(max) of the second MG unit 30 are not greater than the target input power operation quantity Pm*, on the other hand, the target input power operation quantity Pm* cannot be implemented by selecting only one of the first MG unit 29 and the second MG unit 30. Thus, both the first MG unit 29 and the second MG unit 30 are each selected as an MG unit to serve as an object of the control to stabilize the system voltage. In this case, the sum of the target input power operation quantities of the first MG unit 29 and the second MG unit 30 is set at the target input power operation quantity Pm*, and the target input power operation quantity of one of the first MG unit 29 and the second MG unit 30, which has the heat margin hc greater than the heat margin hc of the other MG unit, is set at a value greater than the target input power operation quantity of the other MG unit.

Figure 4:
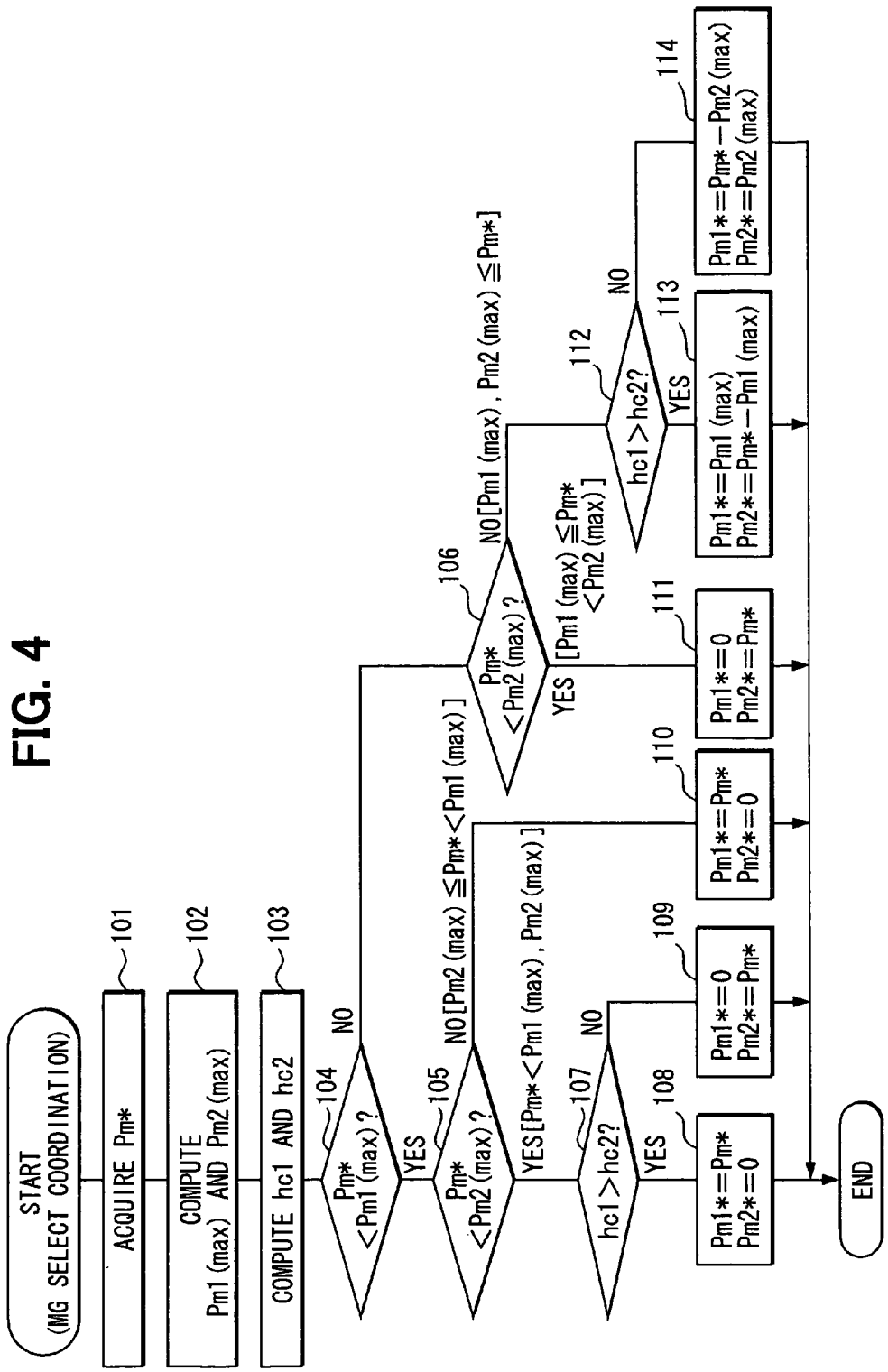
FIG. 4 is a flowchart showing a program executed to carry out the coordination control to select MG units.

Coordination control to select the first MG unit 29 and/or the second MG unit 30 is executed in accordance with an MG selection coordination control program shown in FIG. 4. The flowchart representing the MG selection coordination control program starts with step 101 at which the target input power operation quantity Pm* is received from the P-I controller 53.

Then, at next step 102, in accordance with the present torque command value T1* and present rotation speed N1 of the first AC motor 13, the first upper limit computation unit 72 computes the first upper limit value Pm1(max) of the first MG unit 29 by using map data, a mathematical equation or the like. At the same time, in accordance with the present torque command value T2* and rotation speed N2 of the second AC motor 14, the second upper limit computation unit 73 computes the second upper limit value Pm2(max) of the second MG unit 30 by using map data, a mathematical equation or the like. The first upper limit value Pm1(max), that is, the allowable upper limit value of the operation quantity of the input power, of the first MG unit 29 is determined by a maximum current, maximum voltage and torque command value of the first AC motor 13. Similarly, the second upper limit value Pm2(max), that is, the allowable upper limit value of the operation quantity of the input power, of the second MG unit 30 is determined by a maximum current, maximum voltage and torque command value of the second AC motor 14. The maximum currents of the first AC motor 13 and the second AC motor 14 are determined by the characteristics of the three-phase first inverter 27 and the three-phase second inverter 28 respectively. On the other hand, the maximum voltage of the first AC motor 13 is determined by the maximum current and rotation speed N1 of the first AC motor 13, whereas the maximum voltage of the second AC motor 14 is determined by the maximum current and rotation speed N2 of the second AC motor 14. Thus, the first upper limit value Pm1(max) of the first MG unit 29 can be determined precisely on the basis of a present torque command value T1* and present rotation speed N1 of the first AC motor 13. Similarly, the second upper limit value Pm2(max) of the second MG unit 30 can be determined precisely on the basis of a present torque command value T2* and present rotation speed N2 of the second AC motor 14.

Then, at next step 103, in accordance with the present temperature t1 of the first AC motor 13, the first heat margin computation unit 74 computes the first heat margin hc1 (defined as the maximum of an allowable heat dissipation quantity not causing an overheated state) of the first MG unit 29 by using map data, a mathematical equation or the like. Similarly, in accordance with the present temperature t2 of the second AC motor 14, the second heat margin computation unit 75 computes the second heat margin hc2 (defined as the maximum of an allowable heat dissipation quantity not causing an overheated state) of the second MG unit 30 by using map data, a mathematical equation or the like. The first heat margin hc1 of the first MG unit 29 changes, in accordance with the temperature t1, tolerable heat dissipation temperature and thermal capacity of the first AC motor 13. Similarly, the second heat margin hc2 of the second MG unit 30 changes, in accordance with the temperature t2, tolerable heat dissipation temperature and thermal capacity of the second AC motor 14. The tolerable heat dissipation temperature and thermal capacity of the first AC motor 13 are determined by specifications of the first AC motor 13, whereas the tolerable heat dissipation temperature and thermal capacity of the second AC motor 14 are determined by specifications of the second AC motor 14. Thus, the first heat margin hc1 of the first MG unit 29 can be computed precisely in accordance with the present temperature t0 of the first AC motor 13, whereas the second heat margin hc2 of the second MG unit 30 can be computed precisely in accordance with the present temperature t2 of the second AC motor 14.

Then, at subsequent steps 104, 105 and 106, the MG selection and target input power operation quantity computation unit 76 compares the target input power operation quantity Pm* with the first limit value Pm1(max) of the first MG unit 29 and with the second limit value Pm2(max) of the second MG unit 30 to produce a determination result as to whether or not the target input power operation quantity Pm* is greater than the first limit value Pm1(max) and a determination result as to whether or not the target input power operation quantity Pm* is greater than the second limit value Pm2(max). Then, in accordance with the determination results, the following control is executed.

[1] When the determination results indicate that Pm*<Pm1(max) and Pm*<Pm2(max), that is, when the determination results indicate that both the first limit value Pm1(max) of the first MG unit 29 and the second limit value Pm2(max) of the second MG unit 30 are greater than the target input power operation quantity Pm*, the target input power operation quantity Pm* can be implemented by selecting only either of the first MG unit 29 and the second MG unit 30. In this case, the processing proceeds to step 107, at which an MG unit having a heat margin hc greater than the heat margin hc of the other MG unit is recognized as an MG unit to be selected as an object of the control to stabilize the system voltage. That is, at step 107, the first heat margin hc1 of the first MG unit 29 is compared with the second heat margin hc2 of the second MG unit 30 to produce a result of determination as to whether or not the first heat margin hc1 is greater than the second heat margin hc2.

When the determination result of step 107 indicates that the first heat margin hc1 of the first MG unit 29 is greater than the second heat margin hc2 of the second MG unit 30, that is, when the result of the determination indicates the relation hc1>hc2, the processing proceeds to step 108 at which the first MG unit 29 having a first heat margin hc1 greater than the second heat margin hc2 of the second MG unit 30 is selected to serve as the object of the control to stabilize the system voltage. In addition, the first target input power operation quantity Pm1* of the selected first MG unit 29 is set at the target input power operation quantity Pm*. It is to be noted that, in this case, the second target input power operation quantity Pm2* of the second MG unit 30 is set at 0. That is, Pm1*=Pm*

Pm2*=0.

When the determination result of step 107 indicates that the first heat margin hc1 of the first MG unit 29 is not greater than the second heat margin hc2 of the second MG unit 30, that is, when the result of the determination indicates the relation hc1≦hc2, on the other hand, the processing proceeds to step 109 at which the second MG unit 30 having a second heat margin hc2 at least equal to the first heat margin hc1 of the first MG unit 29 is selected to serve as the object of the control to stabilize the system voltage. In addition, the second target input power operation quantity Pm2* of the selected second MG unit 30 is set at the target input power operation quantity Pm*. It is to be noted that, in this case, the first target input power operation quantity Pm1* of the first MG unit 29 is set at 0. That is, Pm1*=0

Pm2*=Pm*

[2] When the determination results of steps 104 to 106 indicate that Pm2(max)≦Pm*<Pm1(max), that is, when the determination results indicate that only the first limit value Pm1(max) of the first MG unit 29 is greater than the target input power operation quantity Pm*, the processing proceeds to step 110 at which the first MG unit 29 having the first limit value Pm1(max) greater than the target input power operation quantity Pm* is selected to serve as the object of the control to stabilize the system voltage. In addition, the first target input power operation quantity Pm1* of the selected first MG unit 29 is set at the target input power operation quantity Pm*. It is to be noted that, in this case, the second target input power operation quantity Pm2* of the second MG unit 30 is set at 0. That is, Pm1*=Pm*

Pm2*=0

[3] When the determination results of steps 104 to 106 indicate that Pm1(max)≦Pm*<Pm2(max), that is, when the determination results indicate that only the second limit value Pm2(max) of the second MG unit 30 is greater than the target input power operation quantity Pm*, the processing proceeds to step 111 at which the second MG unit 30 having the second limit value Pm2(max) greater than the target input power operation quantity Pm* is selected to serve as the object of the control to stabilize the system voltage. In addition, the second target input power operation quantity Pm2* of the selected first MG unit 30 is set at the target input power operation quantity Pm*. It is to be noted that, in this case, the first target input power operation quantity Pm1* of the first MG unit 29 is set at 0. That is, Pm1*=0

Pm2*=Pm*.

[4] When the determination results of steps 104 to 106 indicate that Pm1(max)≦Pm* and Pm2(max)≦PM*, that is, when the determination results indicate that both the first limit value Pm1(max) of the first MG unit 29 and the second limit value Pm2(max) of the second MG unit 30 are not greater than the target input power operation quantity Pm*, the target input power operation quantity Pm* cannot be implemented by merely selecting only either of the first MG unit 29 and the second MG unit 30. Thus, the first MG unit 29 and the second MG unit 30 are each selected to serve as an object of the control to stabilize the system voltage.

In this case, the processing proceeds to step 112 at which the first heat margin hc1 of the first MG unit 29 is compared with the second heat margin hc2 of the second MG unit 30 to produce a result of determination as to whether or not the first heat margin hc1 is greater than the second heat margin hc2. When the determination result of step 112 indicates that the first heat margin hc1 of the first MG unit 29 is greater than the second heat margin hc2 of the second MG unit 30, that is, when the result of the determination indicates the relation hc1>hc2, the processing proceeds to step 113 at which the first target input power operation quantity Pm1* of the first MG unit 29 having the first heat margin hc1 greater than the second heat margin hc2 of the second MG unit 30 is set at the input power operation quantity Pm1(max). On the other hand, the second target input power operation quantity Pm2* of the second MG unit 30 having the second heat margin hc2 smaller than the first heat margin hc1 of the first MG unit 29 is set at a difference between the input power operation quantity upper limit Pm1(max) and the target input power operation quantity Pm*. That is, $$Pm1* = Pm1(\max)$$

$$Pm2* = Pm* - Pm1(\max)$$

Thus, the sum of the first target input power operation quantity Pm1* of the first MG unit 29 and the second target input power operation quantity Pm2* of the second MG unit 30 is equal to the target input power operation quantity Pm*. In addition, the first target input power operation quantity Pm1* of the first MG unit 29 is set at the input power operation quantity upper limit Pm1(max) greater than the difference of (Pm*−Pm1(max)) at which the second target input power operation quantity Pm2* of the second MG unit 30 is set.

When the determination result of step 112 indicates that the first heat margin hc1 of the first MG unit 29 is not greater than the second heat margin hc2 of the second MG unit 30, that is, when the result of the determination indicates the relation hc1≦hc2, on the other hand, the processing proceeds to step 114 at which the second target input power operation quantity Pm2* of the second MG unit 30 having the second heat margin hc2 at least equal to the first heat margin hc1 of the first MG unit 29 is set at the input power operation quantity Pm2(max). On the other hand, the first target input power operation quantity Pm1* of the first MG unit 29 having the first heat margin hc1 not greater than the second heat margin hc2 of the second MG unit 30 is set at a difference between the input power operation quantity upper limit Pm2(max) and the target input power operation quantity Pm*. That is, $$Pm1* = Pm* - Pm2(\max)$$

$$Pm2* = Pm2(\max)$$

Thus, the sum of the first target input power operation quantity Pm1* of the first MG unit 29 and the second target input power operation quantity Pm2* of the second MG unit 30 is equal to the target input power operation quantity Pm*. In addition, the second target input power operation quantity Pm2* of the second MG unit 30 is set at the input power operation quantity upper limit Pm2(max) greater than the difference of (Pm*−Pm2(max)) at which the first target input power operation quantity Pm1* of the first MG unit 29 is set.

As described above, the MG select coordination control unit 69 selects the first MG unit 29 and/or the second MG unit 30 each to serve as an object of the control to stabilize the system voltage, setting the first target input power operation quantity Pm1* of the first MG unit 29 and the second target input power operation quantity Pm2* of the second MG unit 30 at proper values. Then, as shown in FIG. 2, the MG select coordination control unit 69 supplies the first target input power operation quantity Pm1* of the first MG unit 29 to the first command current computation unit 70 functioning as a system voltage control means and the second target input power operation quantity Pm2* of the second MG unit 30 to the second command current computation unit 71 also functioning as a system voltage control means.

Figure 5:
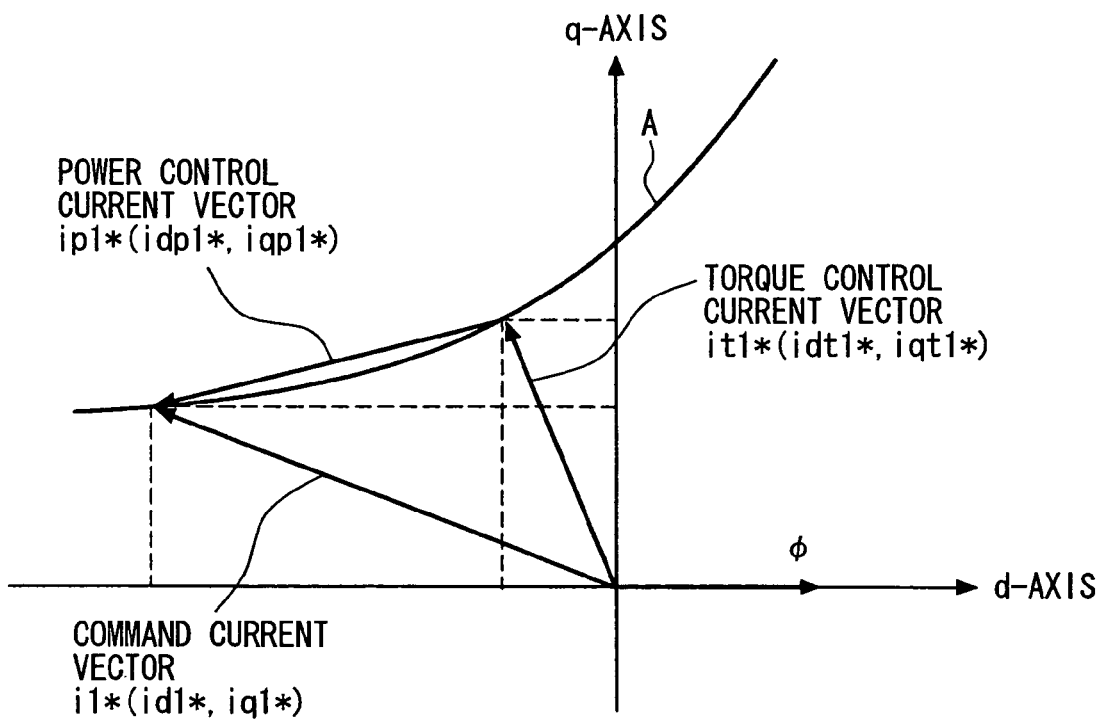
FIG. 5 is a characteristic diagram showing characteristics of various current vectors.

As shown in FIG. 5, the first command current computation unit 70 computes the first power control current vector ip1* (including the d-axis power control current vector idp1* and the q-axis power control current vector iqp1*) for changing a reactive power not contributing anything to generation of a torque in the first AC motor 13 by the first target input power operation quantity Pm1* of the first MG unit 29. Then, the first command current computation unit 70 combines the first torque control current vector it1* (including the d-axis torque control current vector idt1* and the q-axis torque control current vector iqt1*) with the first power control current vector ip1* (including the d-axis power control current vector idp1* and the q-axis power control current vector iqp1*) to result in the final first command current vector i1* (including the d-axis command current vector id1* and the q-axis command current vector iq1*) as expressed by the following equation:

$$i1*(id1*,iq1*) = it1*(idt1*,iqt1*) + ip1*(idp1*,iqp1*)$$

It is to be noted that with the first target input power operation quantity Pm1* of the first MG unit 29 set at 0, the first command current computation unit 70 outputs the first torque control current vector it1* (including the d-axis torque control current vector idt1* and the q-axis torque control current vector iqt1*) as the final first command current vector i1* (including the d-axis command current vector id1* and the q-axis command current vector iq1*) as expressed by the following equation:

$$i1*(id1*,iq1*) = it1*(idt1*,iqt1*)$$

Figure 6:
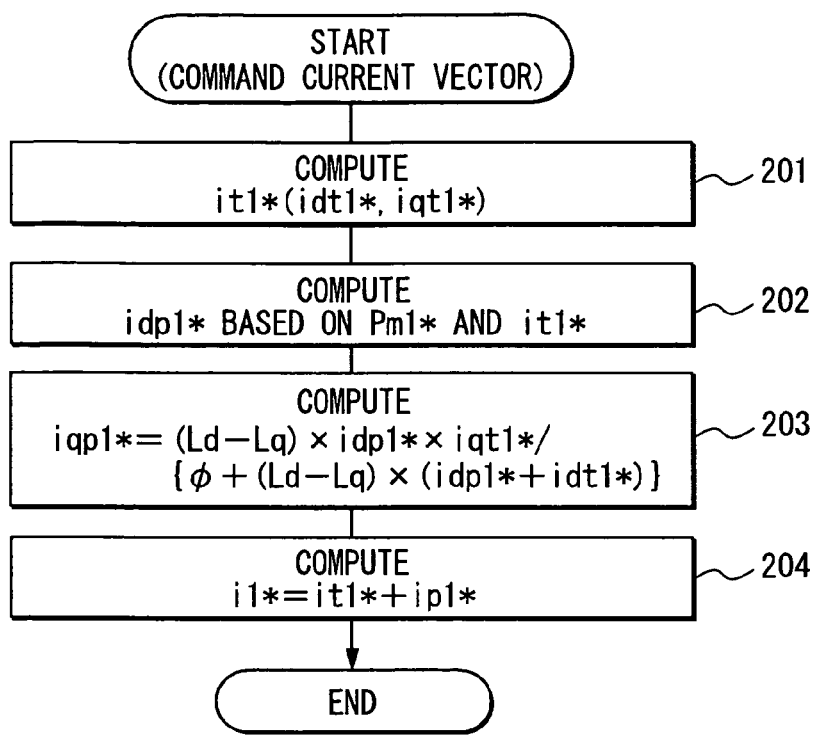
FIG. 6 is a flowchart showing a program executed to carry out processing to compute a command current vector.

The first command current vector i1* is computed by execution of a command current vector computation program shown in FIG. 6. The processing begins with step 201 at which the first torque control current vector it1* (including the d-axis torque control current vector idt1* and the q-axis torque control current vector iqt1*) is computed on the basis of the present torque command value T1* and present rotation speed N1 of the first AC motor 13 by using map data, a mathematical equation or the like.

Then, at next step 202, the d-axis power control current torque idp1* is computed on the basis of the first target input power operation quantity Pm1* of the first MG unit 29 and the first torque control current vector it1* (including the d-axis torque control current vector idt1* and the q-axis torque control current vector iqt1*) by using map data, a mathematical equation or the like. Subsequently, at next step 203, the q-axis power control current vector iqp1* is computed on the basis of the d-axis power control current vector idp1* in accordance with the following equation:

$$iqp1* = (Ld-Lq) \times idp1* \times iqt1* / \{\phi(Ld-Lq) \times (idp1* + idt1*)\}$$

where notations $\phi$, Ld and Lq denote respectively a flux linkage, a d-axis inductance and a q-axis inductance, which are machine constants of the first AC motor 13.

The processes carried out at steps 202 and 203 result in the first power control current vector ip1* (including the d-axis power control current vector idp1* and the q-axis power control current vector iqp1*) for changing a reactive power not contributing anything to generation of a torque in the first AC motor 13 by the first target input power operation quantity Pm1* of the first MG unit 29 while sustaining the torque generated in the first AC motor 13 at a constant value (that is, the torque command value T1*).

Finally, at last step 204, the first command current computation unit 70 combines the first torque control current vector it1* (including the d-axis torque control current vector idt1* and the q-axis torque control current vector iqt1*) with the first power control current vector ip1* (including the d-axis power control current vector idp1* and the q-axis power control current vector iqp1*) to result in the final first command current vector i1* (including the d-axis command current vector id1* and the q-axis command current vector iq1*) as expressed by the following equation:

$$i1*(id1*,iq1*) = it1*(idt1*,iqt1*) + ip1*(idp1*,iqp1*)$$

Much like the first command current computation unit 70, on the other hand, the second command current computation unit 71 computes the second power control current vector ip2* (including the d-axis power control current vector idp2* and the q-axis power control current vector iqp2*) for changing a reactive power not contributing anything to generation of a torque in the second AC motor 14 by the second target input power operation quantity Pm2* of the second MG unit 30. Then, the second command current computation unit 71 combines the second torque control current vector it2* (including the d-axis torque control current vector idt2* and the q-axis torque control current vector iqt2*) with the second power control current vector ip2* (including the d-axis power control current vector idp2* and the q-axis power control current vector e iqp2*) to result in the final second command current vector i2* (including the d-axis command current vector id2* and the q-axis command current vector iq2*) as expressed by the following equation:

$$i2^*(id2^*, iq2^*) = it2^*(idt2^*, iqt2^*) + ip2^*(idp2^*, iqp2^*)$$

It is to be noted that with the second target input power operation quantity Pm2* of the second MG unit 30 set at 0, the second command current computation unit 71 outputs the second torque control current vector it2* as the final second command current vector i2* as expressed by the following equation:

$$i2^*(id2^*, iq2^*) = it2^*(idt2^*, iqt2^*)$$

As described above, the control to stabilize the system voltage is executed by adjusting the input powers of the first MG unit 29 and/or the second MG unit 30 so as to decrease the difference ΔVs between the target value Vs* and detected value Vsf of the system voltage while keeping the torques generated by the first and second AC motors 13 and/or 14 at constant values.

In addition, to eliminate mutual interferences between the system voltage stabilization control to stabilize the system voltage by adjusting the input powers of the first MG unit 29 and/or the second MG unit 30 as described above and the control executed by the voltage boosting converter 21 to adjust the system voltage, the motor control apparatus 37 executes conversion power control of controlling a conduction duty ratio Dc of a switching device (not shown) as a device in the voltage boosting converter 21 so as to reduce the difference ΔPi between the command value Pi* of the power, which is output by the voltage boosting converter 21 as a power referred to hereafter as a conversion power, and the detected value Pi of the conversion power.

Specifically, as shown in FIG. 2, to compute a command value Pi* of the conversion power, first of all, a torque command value T1* and rotation speed N1 of the first AC motor 13 are supplied to a first shaft output computation unit 56 to be used for computing a shaft output PD1 of the first AC motor 13. At the same time, the torque command value T1* and rotation speed N1 of the first AC motor 13 are supplied to a first output loss computation unit 57 to be used for computing a output loss PL1 of the first AC motor 13. Then, an adder 58 adds the shaft output PD1 of the first AC motor 13 to the output loss PL1 of the first AC motor 13 to compute an input power Pi1 of the first AC motor 13. At that time, when the first AC motor 13 is functioning as a generator, the computation result of the input power Pi1 of the first AC motor 13 is a negative value.

In the mean time, a torque command value T2* and rotation speed N2 of the second AC motor 14 are supplied to a second shaft output computation unit 59 to be used for computing a shaft output PD2 of the second AC motor 14. At the same time, the torque command value T2* and rotation speed N2 of the second AC motor 14 are supplied to a second output loss computation unit 60 to be used for computing a shaft loss PL2 of the second AC motor 14. Then, an adder 61 adds the shaft output PD2 of the second AC motor 14 to the shaft loss PL2 of the second AC motor 14 to compute an input power Pi2 of the second AC motor 14. At that time, when the second AC motor 14 is functioning as a generator, the computation result of the input power Pi2 of the second AC motor 14 is a negative value.

Then, an adder 62 adds the input power Pi1 of the first AC motor 13 to the input power Pi2 of the second AC motor 14 to compute a total power Pi*. This total power Pi* is supplied to a second low pass filter 63 serving as a second low frequency component passing means for carrying out a low pass filtering process to pass only components included in the total power Pi* as components each having a low frequency. A total power Pif* obtained as a result of the low pass filtering process is taken as a command value Pif* of the conversion power. The adder 62 and the second low pass filter 63 functions as a conversion power command value computation means.

To compute a detected value Pi of the conversion power, on the other hand, the signal output by the current sensor 26 as a signal representing the detected value ic of the output current of the voltage boosting converter 21 is supplied to a third low pass filter 64 serving as a third low frequency component passing means for carrying out a low pass filtering process to pass only components included in the output current of the voltage boosting converter 21 as components each having a low frequency. The third low pass filter 64 supplies a detected value icf of the output current of the voltage boosting converter 21 as a result obtained from the low pass filtering process to a conversion power detection unit 65 serving as a conversion value computation means. The conversion power detection unit 65 multiplies the detected value icf by the target value Vs* of the system voltage to compute the detected value Pi of the conversion power. It is to be noted that the detected value Pi of the conversion power can also be computed by multiplying the detected value icf of the output current of the voltage boosting converter 21 by the detected value Vsf of the system voltage.

Then, a subtractor 66 computes a difference ΔPi between the command value Pif* and detected value Pi of the conversion power. The subtractor 66 supplies the difference ΔPi to a P-I controller 67 serving as a conversion power control quantity computation means for computing a conduction duty ratio Dc of a switching device (not shown) by execution of proportional and integral (P-I) control to reduce the difference ΔPi between a command value Pif* and detected value Pi of the conversion power. The conduction duty ratio Dc is supplied to a voltage boosting drive signal computation unit 68 serving as a conversion power control means. Subsequently, the voltage boosting drive signal computation unit 68 computes voltage boosting drive signals UCU and UCL on the basis of the conduction duty ratio Dc and supplies the voltage boosting drive signals UCU and UCL to the voltage boosting converter 21.

As described above, the conversion power control of adjusting the output power of the voltage boosting converter 21 is executed to reduce the difference ΔPi between the command value Pif* and detected value Pi of the conversion power and, at the same time, eliminate mutual interferences between the system voltage stabilization control to stabilize the system voltage by adjusting the input powers of the first MG unit 29 and/or the second MG unit 30 and the control executed by the voltage boosting converter 21 to adjust the system voltage.

In the first embodiment described above, the system voltage stabilization control to suppress variations in the system voltage, which is a voltage appearing on the power supply line 22, is executed by adjusting the input powers of the first MG unit 29 and/or the second MG unit 30 (or the first AC motor 13 and/or the second AC motor 14) so as to decrease the difference ΔVs between the target value Vs* and detected value Vsf of the system voltage. Thus, even when balance of power between the first and second AC motors 13 and 14 changes considerably due to a change in vehicle operating state or another cause, the system voltage can be stabilized effectively. In addition, the effect of the stabilization of the voltage appearing on the power supply line can be enhanced without using the voltage boosting converter 21 having high performance and without employing a smoothing capacitor 24 having a large capacitance. Thus, demands for a compact system and a low cost can be met.

In addition, in the first embodiment, either one or both of the first MG unit 29 and the second MG unit 30 are selected by using information on the first MG unit 29 and the second MG unit 30 as information on the operating state of the electric vehicle and by considering the fact that the upper limits of the input power operation quantities of the first MG unit 29 and the second MG unit 30 vary because the driving and power generation states of the first MG unit 29 and the second MG unit 30 change in accordance with the operating state of the electric vehicle. Thus, it is possible to select the first MG unit 29 and/or the second MG unit 30 by which the target input power operation quantity Pm* required for stabilization of the system voltage can be realized. Then, by executing the control to stabilize the system voltage on one selected MG unit or, as an alternative, by letting the two selected MG units share the control load of the control to stabilize the system voltage, the target input power operation quantity Pm* required for stabilization of the system voltage can be realized certainly. As a result, the system voltage stabilization function can be executed fully without being affected by the operating state of the electric vehicle. Typical information on the first MG unit 29 includes the torque command value, rotation speed and temperature of the first AC motor 13, whereas typical information on the second MG unit 30 includes the torque command value, rotation speed and temperature of the second AC motor 14.

The torque command value T1* and rotation speed N1 of the first AC motor 13 are used for computing the first upper limit value Pm1(max) of the first MG unit 29, whereas the torque command value T2* and rotation speed N2 of the second AC motor 14 are used for computing the second upper limit value Pm2(max) of the second MG unit 30. Then, the first limit value Pm1(max) of the first MG unit 29 is compared with the second limit value Pm2(max) of the second MG unit 30 to produce a result of determination as to whether or not the first limit value Pm1(max) is greater than the second limit value Pm2(max) of the second MG unit 30. Finally, the first MG unit 29 and/or the second MG unit 30 are each selected to serve as an object of the control to stabilize the system voltage. Thus, it is possible to select the first MG unit 29 and/or the second MG unit 30 by which the target input power operation quantity Pm* required for stabilization of the system voltage can be realized certainly.

In addition, the heat margins hc1 and hc2 of the first MG unit 29 and the second MG unit 30 are computed on the basis of temperatures to and t2 of the first MG unit 29 and the second MG unit 30 respectively. Then, the first heat margin hc1 of the first MG unit 29 is compared with the second heat margin hc2 of the second MG unit 30 to produce a result of determination as to whether or not the first heat margin hc1 is greater than the second heat margin hc2 of the second MG unit 30. Finally, an MG unit having the greater heat margin hc is selected to serve as an object of the control to stabilize the system voltage. Thus, it is possible to prevent the MG unit from being over-heated due to the control to stabilize the system voltage.

In the case of the first embodiment implementing the system for controlling the first AC motor 13 and the second AC motor 14 by the sinusoidal PWM control method, in execution of the control to stabilize the system voltage, the current vectors are adjusted so as to change only the reactive powers not contributing anything to generation of torques in the first AC motor 13 and the second AC motor 14. In this way, the input powers of the first AC motor 13 and the second AC motor 14 are adjusted to control the system voltage while sustaining the torque generated in the first AC motor 13 at a constant value (that is, the torque command value T1*) and sustaining the torque generated in the second AC motor 14 at another constant value (that is, the torque command value T2*). Thus, variations in the system voltage can be suppressed without adversely affecting the operating state of the vehicle.

As described above, in the first embodiment, the current vectors of the first AC motor 13 and the second AC motor 14 are adjusted to control the input powers of the first AC motor 13 and the second AC motor 14 while sustaining the torque generated in the first AC motor 13 at a constant value and sustaining the torque generated in the second AC motor 14 at another constant value. It is to be noted however that, instead of adjusting the current vectors, the voltage vectors of the first AC motor 13 and the second AC motor 14 can also be adjusted to control the input powers of the first AC motor 13 and the second AC motor 14 while sustaining the torque generated in the first AC motor 13 at a constant value and sustaining the torque generated in the second AC motor 14 at another constant value.

Second Embodiment

Figure 7:
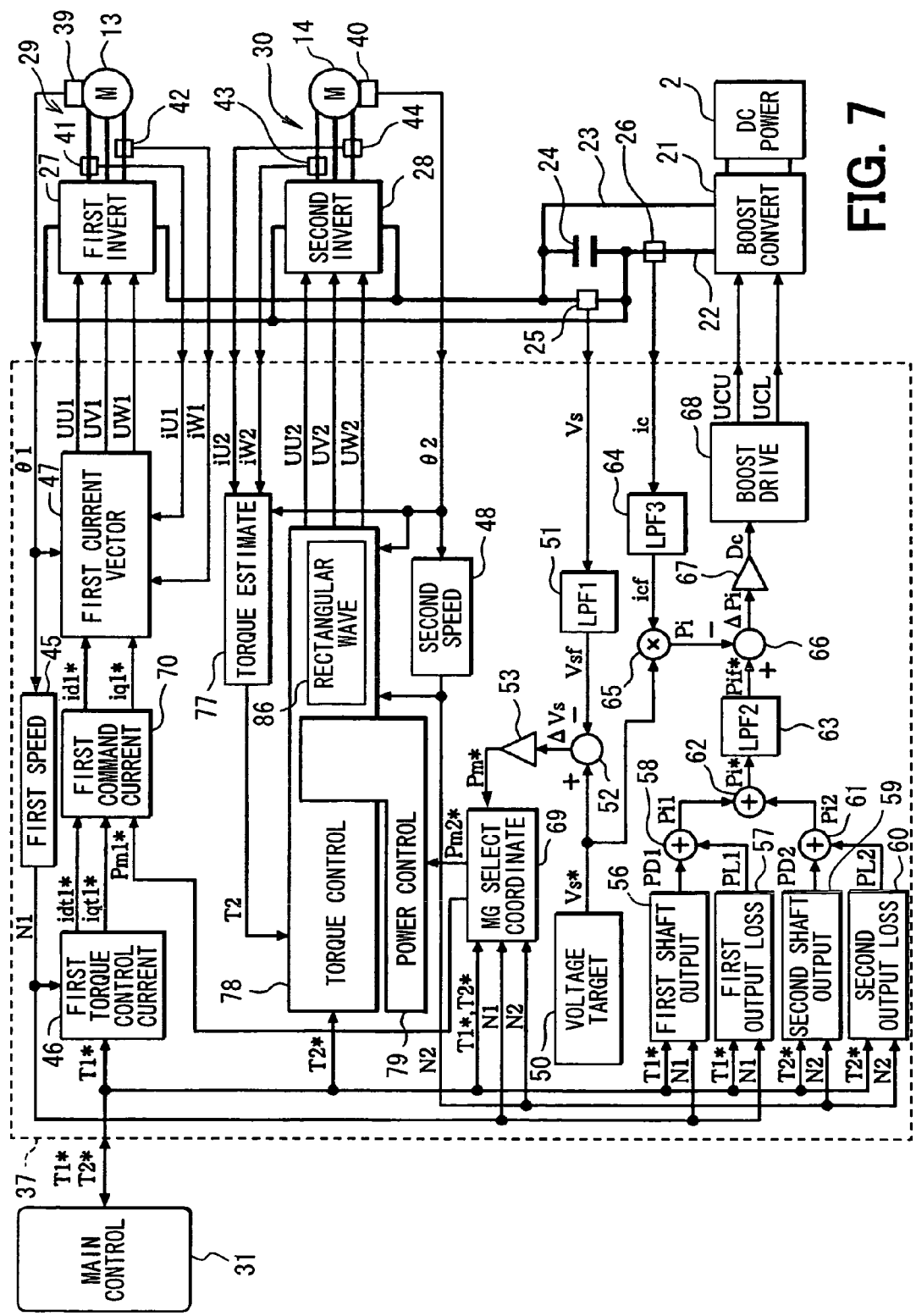
FIG. 7 is a block diagram showing a system for driving an electric vehicle in accordance with a second embodiment of the present invention.

In the first embodiment, the first AC motor 13 and the second AC motor 14 are controlled by the sinusoidal PWM control method. In a second embodiment shown in FIG. 7, on the other hand, the first AC motor 13 is controlled by the sinusoidal PWM control method but the second AC motor 14 is controlled by a rectangular waveform control method.

In execution of torque control on the second AC motor 14, the motor control unit 37 generates three-phase voltage command signals UU2, UV2 and UW2 by the rectangular waveform control method on the basis of the torque command value T2* output by the main control unit 31, the U-phase current iU2 and W-phase current iW2 of the second AC motor 14 as well as the rotor rotational position θ2 of the second AC motor 14. The rectangular waveform control method adopted for the second AC motor 14 is a method of changing electrical conduction of the AC motor 14 every predetermined value of an electrical angle of the AC motor 14.

In controlling the AC motor 14 by the rectangular waveform control method, the duty ratio Duty of the rectangular waveform of the current flowing to the AC motor 14 is changed to vary the pulse width of the rectangular waveform. At the same time, the phase ϕ of the rectangular waveform is also changed to sustain the torque generated by the second AC motor 14 at constant value (that is, at the torque command value T2*). Thus, by adjusting the duty ratio Duty and the phase ϕ, the input power of the second AC motor 14 can be controlled so as to suppress variations in the system voltage, while sustaining the torque generated by the second AC motor 14 unchanged (that is, at the torque command value T2*).

Specifically, the signal output by the rotor rotational position sensor 40 as the signal representing the rotor rotational position θ2 of the second AC motor 14 is supplied to the second rotation speed computation unit 48 for computing the rotation speed N2 of the second AC motor 14. At the same time, signals output by the current sensors 44 and 43 as signals representing respectively the U-phase current iU2 and W-phase current iW2 of the second AC motor 14 as well as the signal representing the rotor rotational position θ2 of the second AC motor 14 are supplied to the torque estimation unit 77 for estimating a torque T2 generated by the current flowing to the second AC motor 14.

Figure 8:
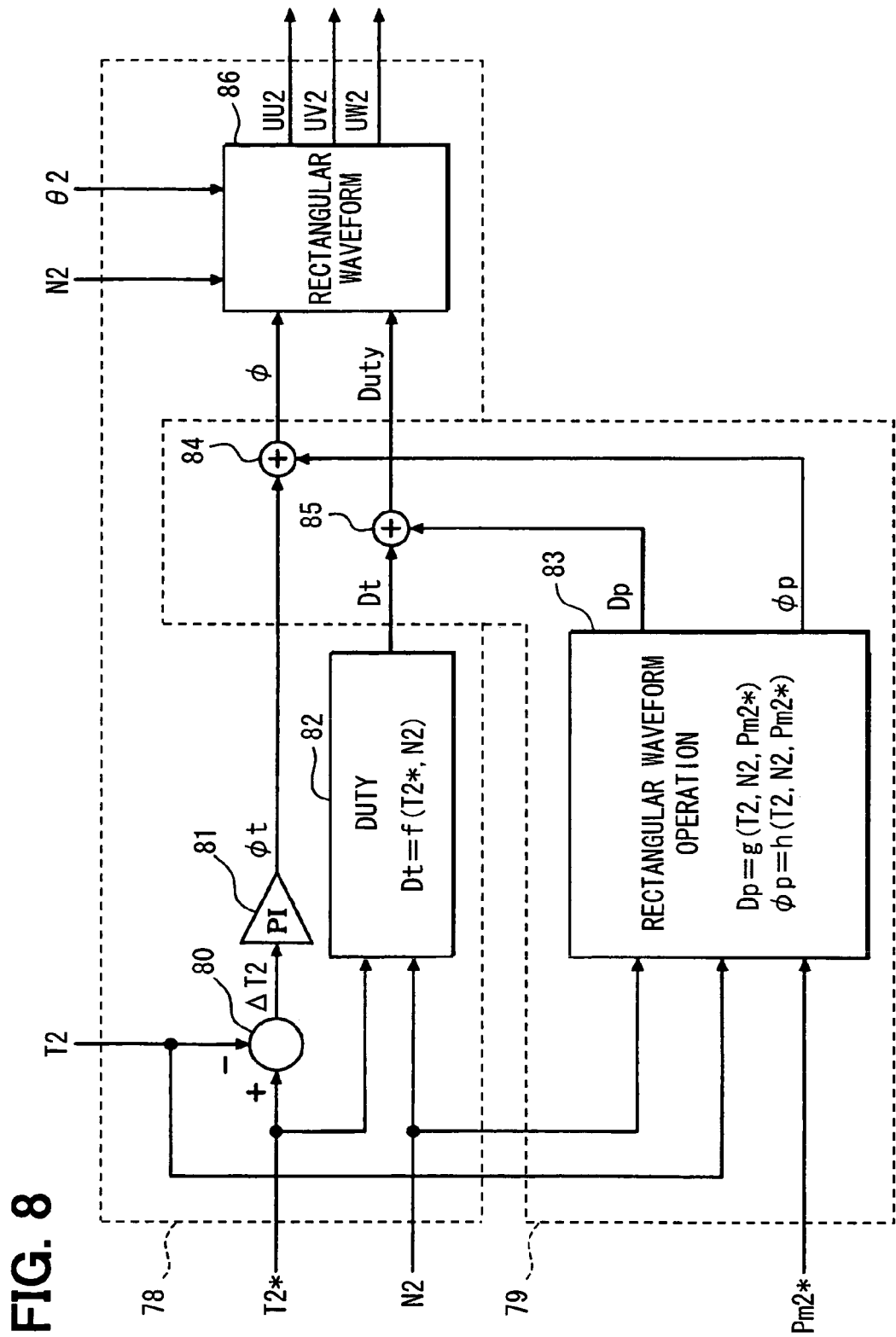
FIG. 8 is a block diagram showing a torque control unit and a power control unit.

Then, as shown in FIG. 8, a subtractor 80 employed in the torque control unit 78 serving as a motor control means computes a difference ΔT2 between the torque command value T2* of the second AC motor 14 and the estimated torque value T2, supplying the difference ΔT2 to a P-I controller 81. The P-I controller 75 executes P-I control to adjust a phase φt of the rectangular waveform so that the phase φt reduces the difference ΔT2 between the torque command value T2* and the estimated value T2. A duty computation unit 82 computes a duty ratio Dt of the rectangular waveform on the basis of the torque command value T2* of the second AC motor 14 and the rotation speed N2 of the second AC motor 14 by using typically map data or a mathematical equation.

Figure 9:
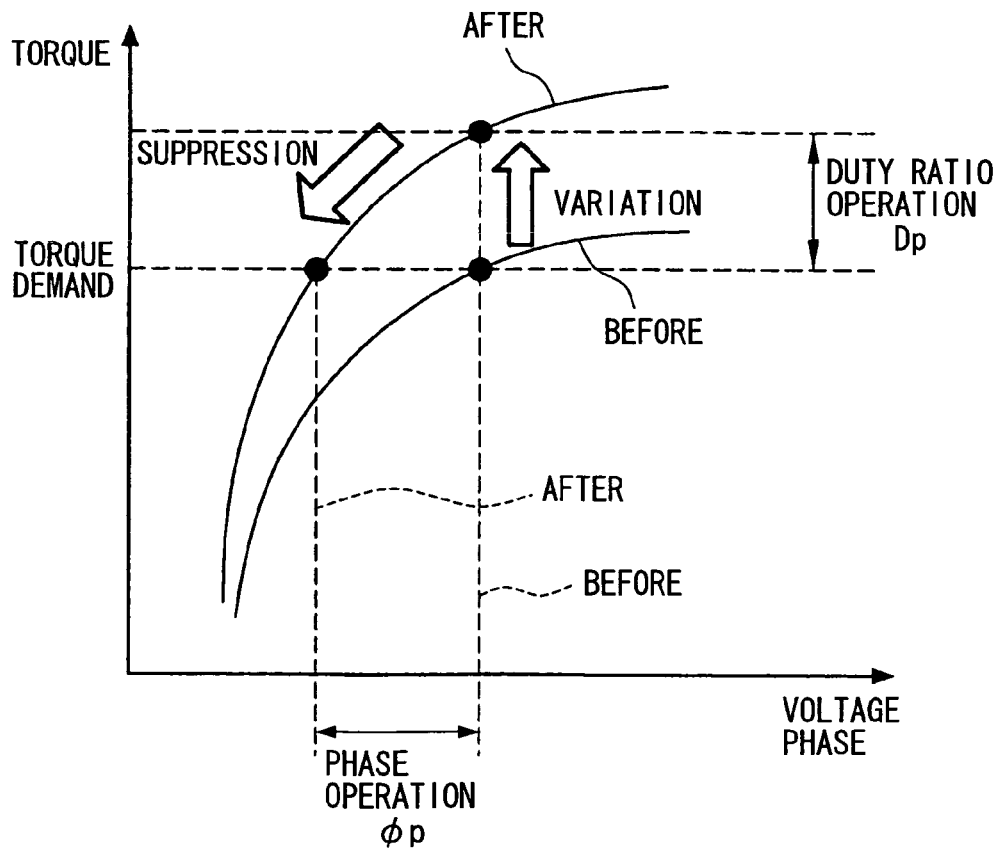
FIG. 9 is a characteristic diagram showing a relation between voltage phase and torque.

Then, a target input power operation quantity output by the MG select coordination control unit 69 as the second target input power operation quantity Pm2* of the second MG unit 30, the estimated torque T2 and the rotation speed N2 are supplied to a rectangular waveform operation quantity computation unit 83 in the power control unit 79 functioning as a system voltage control means to be used by the rectangular waveform operation quantity computation unit 83 for computing a duty ratio operation quantity Dp and a phase operation quantity φp as follows. First, the rectangular waveform operation quantity computation unit 83 computes the duty ratio operation quantity Dp on the basis of the second target input power operation quantity Pm2* of the second MG unit 30, the estimated torque T2 and the rotation speed N2 by using map data, the mathematical equation or the like. The duty ratio operation quantity Dp computed in this way is a quantity for changing the input power of the second AC motor 14 by the second target input power operation quantity Pm2* of the second MG unit 30 as understood from FIG. 9. Then, the rectangular waveform operation quantity computation unit 83 computes a phase operation quantity φp on the basis of the second target input power operation quantity Pm2* of the second MG unit 30, the estimated torque T2 and the rotation speed N2 by using map data, a mathematical equation or the like. The phase operation quantity φp computed in this way is a quantity according to the computed duty ratio operation quantity Dp. That is, as shown in FIG. 9, the rectangular waveform operation quantity computation unit 83 computes a phase operation quantity φp for suppressing variations of the torque generated by the second AC motor 14 due to application of a duty ratio determined by the duty ratio operation quantity Dp.

The rectangular waveform operation quantity computation unit 83 includes a quantity limiting means. The quantity limiting means is for carrying out a guarding process to prevent each of the phase operation quantity φp and the duty ratio operation quantity Dp from exceeding a predetermined limit value. To be more specific, the limiting means prevents each of the phase operation quantity φp and the duty ratio operation quantity Dp from increasing to an excessively large value greater than the predetermined limit value.

It is to be noted that, in the processing to compute the phase operation quantity φp and the duty ratio operation quantity Dp, the torque command value T2* can be used as a substitute for the estimated torque T2. In addition, as will be described later, the rectangular waveform operation quantity computation unit 83 may also compute a phase operation quantity φp on the basis of a final duty ratio Duty (=Dt+Dp) to be described later and the torque command value T2* as a phase operation quantity φp suppressing torque variations generated by the second AC motor 14 as a result of a duty ratio operation based on the duty ratio.

Then, an adder 84 in the power control unit 79 adds the phase operation quantity φp to the phase φt of the rectangular waveform to produce a final phase φ (=φt+φp) of the rectangular waveform. At the same time, an adder 85 also in the power control unit 79 adds the duty ratio operation quantity Dp to the duty ratio Dt of the rectangular waveform to produce a final duty ratio Duty (=Dt+Dp) of the rectangular waveform. Then, a rectangular waveform computation unit 86 in the torque control unit 78 computes three-phase voltage command signals UU2, UV2 and UW2 (rectangular waveform command signals) on the basis of the final phase φ of the rectangular waveform, the final duty ratio Duty of the rectangular waveform, the rotor rotational position θ2 of the second AC motor 14 and the rotation speed N2 of the second AC motor 14, outputting the three-phase voltage command signals UU2, UV2 and UW2 to the three-phase second inverter 28.

As described above, the control to stabilize the system voltage is executed to suppress variations in the system voltage by adjusting the input power of the second MG unit 30 (or the second AC motor 14) while sustaining the torque generated in the second AC motor 14 at a constant value (that is, the torque command value T2*) so as to reduce the difference ΔVs between the target value Vs* and the detected value Vsf of the system voltage.

In addition, in the same way as the first embodiment, the motor control apparatus 37 selects either one or both of the first MG unit 29 and the second MG unit 30 by using information on the first MG unit 29 and the second MG unit 30 as information on the operating state of the electric vehicle, executing the control to stabilize the system voltage by using the selected MG units. As described above, typical information on the first MG unit 29 includes the torque command value, rotation speed and temperature of the first AC motor 13, whereas typical information on the second MG unit 30 includes the torque command value, rotation speed and temperature of the second AC motor 14.

Also in the case of the second embodiment described above, the motor control apparatus 37 selects either one or both of the first MG unit 29 and the second MG unit 30 by using information on the first MG unit 29 and the second MG unit 30 as information on the operating state of the electric vehicle. It is thus possible to select the first MG unit 29 and/or the second MG unit 30 by which the target input power operation quantity Pm* required for stabilization of the system voltage can be implemented. Then, by executing the control to stabilize the system voltage on one selected MG unit or, as an alternative, by letting the two or more selected MG units share the control load of the control to stabilize the system voltage, the target input power operation quantity Pm* required for stabilization of the system voltage can be realized certainly. Thus, the system voltage stabilization function can be executed fully without being affected by the operating state of the electric vehicle. As described above, typical information on the first MG unit 29 includes the torque command value, rotation speed and temperature of the first AC motor 13, whereas typical information on the second MG unit 30 includes the torque command value, rotation speed and temperature of the second AC motor 14.

In addition, in the case of the second embodiment implementing the system for controlling the second AC motor 14 by the rectangular waveform control method, in execution of the control to stabilize the system voltage, first of all, the rectangular waveform operation quantity computation unit 83 computes the duty ratio operation quantity Dp for changing the input power of the second AC motor 14 by the second target input power operation quantity Pm2* of the second MG unit 30. Then, the rectangular waveform operation quantity computation unit 83 computes the phase operation quantity φp suppressing torque variations generated by the second AC motor 14 as a result of the duty ratio operation based on the duty ratio. Thus, the control to stabilize the system voltage can be executed to suppress variations in the system voltage by adjusting the input power of the second AC motor 14 while sustaining the torque generated in the second AC motor 14 at a constant value (that is, the torque command value T2*). As a result, variations in the system voltage can be suppressed without badly affecting the operating state of the vehicle.

It is to be noted that, in the first and second embodiments, the input power operation quantity upper limit of the first MG unit 29 is determined on the basis of the torque command value and rotation speed of the first AC motor 13. Similarly, the input power operation quantity upper limit of the second MG unit 30 is determined on the basis of the torque command value and rotation speed of the second AC motor 14. However, the input power operation quantity upper limit of the first MG unit 29 may also be determined on the basis of information on the first MG unit 29. Similarly, the input power operation quantity upper limit of the second MG unit 30 may also be determined on the basis of information on the second MG unit 30. In this case, the information on the first MG unit 29 is at least one of the torque command value, rotation speed and temperature of the first AC motor 13 while the information on the second MG unit 30 is at least one of the torque command value, rotation speed and temperature of the second AC motor 14. As an alternative, the input power operation quantity upper limits of the first MG unit 29 and the second MG unit 30 can also be determined on the basis of information on the electric vehicle. The information on the electric vehicle is typically at least one of the speed and output shaft torque of the vehicle.

In addition, in the first and second embodiments, the conversion power control of adjusting the conversion power of the voltage boosting converter 21 is executed by adjusting the output power of the voltage boosting converter 21 to reduce the difference ΔPi between the command value Pi* and detected value Pi of the output power. However, the conversion power control of adjusting the conversion power of the voltage boosting converter 21 may also be executed by adjusting the input power of the voltage boosting converter 21 to reduce the difference ΔPi between the command value Pi* and detected value Pi of the input power.

Third Embodiment

Figure 10:
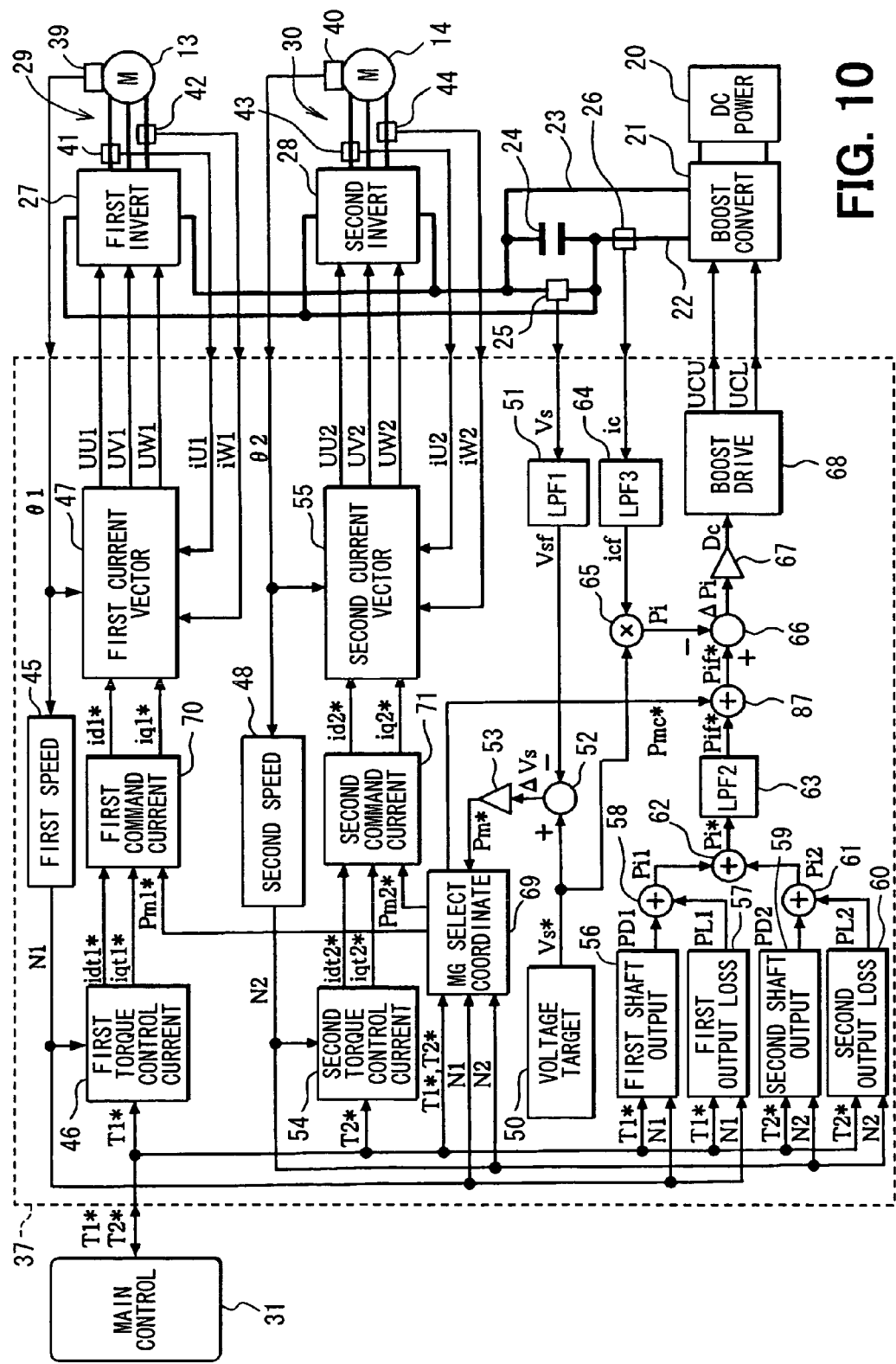
FIG. 10 is a block diagram showing a system for controlling AC motors in accordance with a third embodiment of the present invention.

In a third embodiment shown in FIG. 10, the motor control apparatus 37 executes conversion power control of controlling a conduction duty ratio Dc of a switching device (not shown) as a device in the voltage boosting converter 21 so as to reduce the difference ΔPi between a command value Pif* of a power, which is output by the voltage boosting converter 21 as a conversion power, and a detected value Pi of the conversion power.

A total power Pi* is supplied to the second low pass filter 63 serving as the second low frequency component passing means for carrying out the low pass filtering process to pass only components included in the total power Pi* as components each having a low frequency. A post-filtering total power Pif* is obtained as a result of the low pass filtering process. An adder 87 at a stage following the second low pass filter 63 adds a target output power operation quantity Pmc* to the post-filtering total power Pif* to result in the final command value Pif* (=Pif*+Pmc*) of the conversion power. The final command value Pif* of the conversion power is used to get rid of mutual interferences between the system voltage stabilization control to stabilize the system voltage by adjusting the input power of the second MG unit 30 as described above and the control executed by the voltage boosting converter 21 to adjust the system voltage.

Figure 11:
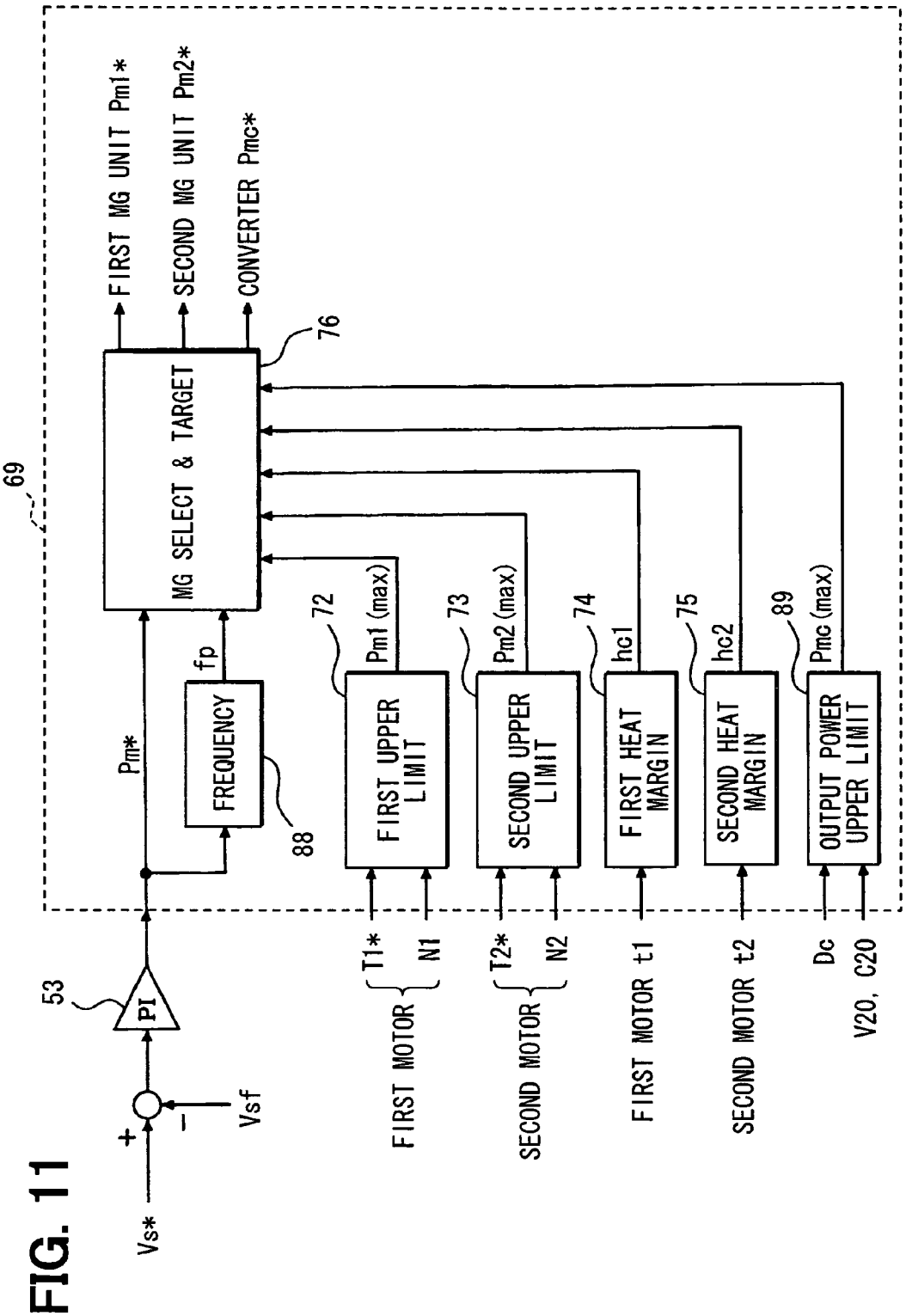
FIG. 11 is a block diagram showing a unit for executing coordination control to select MG units.

In addition, the motor control apparatus 37 selects the first MG unit 29 and the second MG unit 30 as well as the voltage boosting converter 21 as follows. As shown in FIG. 11, first of all, a target power operation quantity Pm* (output by the P-I controller 53) is supplied to a frequency computation unit 88 for computing the frequency fp of the target power operation quantity Pm*. The frequency fp of the target power operation quantity Pm* is information on variations in the system voltage.

The conduction duty ratio Dc of the above switching device in the voltage boosting converter 21, the voltage V20 and a charge condition C20 of the DC power supply 20 are supplied to an output power operation quantity upper limit computation unit 89 for computing an output power operation quantity upper limit value Pmc(max) of the voltage boosting converter 21 by using map data, a mathematical equation or the like.

The upper limit value Pmc(max) of the voltage boosting converter 21, the frequency fp of the target power operation quantity Pm*, a first input power operation quantity upper limit value Pmc1(max) of the first MG unit 29, a second input power operation quantity upper limit value Pmc2(max) of the second MG unit 30, a first heat margin hc1 of the first MG unit 29 and a second heat margin hc2 of the second MG unit 30 are supplied to an MG selection and target input power operation quantity computation unit 76. The MG selection and target input power operation quantity computation unit 76 compares the frequency fp serving as information on variations in the system voltage with a predetermined reference frequency fth. When the frequency fp of the target power operation quantity Pm* is computed higher than the predetermined reference frequency fth, the frequency of the variation in the system voltage is determined to be high. In this case, priority is given to execution of the control to stabilize variations in the system voltage by using the first MG unit 29 and/or the second MG unit 30, which are proper for suppressing high frequency variations in the system voltage. When the frequency fp of the target power operation quantity Pm* is computed to be lower than the predetermined reference frequency fth, on the other hand, the frequency of the variation in the system voltage is determined to be low. In this case, priority is given to execution of the control to stabilize variations in the system voltage by using the voltage boosting converter 21, which is proper for suppressing low frequency variations in the system voltage.

To prioritize the execution of the control to stabilize variations in the system voltage by using the first MG unit 29 and/or the second MG unit 30, first of all, it is necessary to produce a result of determination as to whether or not the target power operation quantity Pm* can be implemented by using only the first MG unit 29 and the second MG unit 30 by producing a result of determination as to whether or not the target power operation quantity Pm* is greater than the sum {Pm1(max)+Pm2(max)} of the first limit value Pmc1(max) of the first MG unit 29 and the second limit value Pmc2(max) of the second MG unit 30.

When the result of the determination indicates that the target power operation quantity Pm* is greater than the sum {Pm1(max)+Pm2(max)} of the first limit value Pmc1(max) of the first MG unit 29 and the second limit value Pmc2(max) of the second MG unit 30, that is, when the result of the determination indicates that the target power operation quantity Pm* cannot be implemented by using only the first MG unit 29 and the second MG unit 30, the second MG unit 30 and the voltage boosting converter 21 are each selected to serve as an object of the control to stabilize variations in the system voltage. In this case, the first target input power operation quantity Pm1* of the first MG unit 29 is set at the first limit value Pmc1(max) of the first MG unit 29, whereas the second target input power operation quantity Pm2* of the second MG unit 30 is set at the second limit value Pmc2(max) of the second MG unit 30. To compensate the target input power operation quantities Pm1* and Pm2* for a shortage of {Pm*−(Pm1(max)+Pm2(max))} from the target power operation quantity Pm*, the target output power operation quantity Pmc* of the voltage boosting converter 21 is set at the shortage of {Pm*−(Pm1(max)+Pm2(max))} from the target power operation quantity Pm*.

When the result of the determination indicates that the target power operation quantity Pm* is not greater than the sum {Pm1(max)+Pm2(max)} of the first limit value Pmc1(max) of the first MG unit 29 and the second limit value Pmc2(max) of the second MG unit 30, that is, when the result of the determination indicates that the target power operation quantity Pm* can be implemented by using only either one or both of the first MG unit 29 and the second MG unit 30, on the other hand, either one or both of the first MG unit 29 and the second MG unit 30 are each selected to serve as an object of the control to stabilize variations in the system voltage.

In this case, the target output power operation quantity Pmc* of the voltage boosting converter 21 is set at 0. In addition, when the first limit value Pmc1(max) of the first MG unit 29 and the second limit value Pmc2(max) of the second MG unit 30 are both greater than the target power operation quantity Pm*, either of the first MG unit 29 and the second MG unit 30 can be used for implementing the target power operation quantity Pm*. Thus, an MG unit having a greater heat margin hc is selected to serve as an object of the control to stabilize variations in the system voltage, and the target input power operation quantity of the selected MG unit is set at the target power operation quantity Pm*.

When the input power operation quantity upper limit value of only one of the first MG unit 29 and the second MG unit 30 is greater than the target power operation quantity Pm*, the MG unit having the input power operation quantity upper limit value greater than the target power operation quantity Pm* is selected to serve as an object of the control to stabilize variations in the system voltage, and the target input power operation quantity of the selected MG unit is set at the target power operation quantity Pm*.

When the target power operation quantity Pm* is greater than the first limit value Pmc1(max) of the first MG unit 29 and also greater than the second limit value Pmc2(max) of the second MG unit 30, the target power operation quantity Pm* cannot be implemented by using only one of the first MG unit 29 and the second MG unit 30. Thus, both the first MG unit 29 and the second MG unit 30 are each selected to serve as an object of the control to stabilize variations in the system voltage. In this case, the first target input power operation quantity Pm1* of the first MG unit 29 and the second target input power operation quantity Pm2* of the second MG unit 30 are set at such values that their sum is equal to the target power operation quantity Pm* and the target input power operation quantity of the MG unit having a greater heat margin hc is set at a value greater than the value at which the target input power operation quantity of the MG unit having a smaller heat margin hc is set.

When high priority is to be given to execution of the control to stabilize variations in the system voltage by using the voltage boosting converter 21, on the other hand, first of all, it is necessary to produce a result of determination as to whether or not the target power operation quantity Pm* can be implemented by using only the voltage boosting converter 21 by producing a result of determination as to whether or not the target power operation quantity Pm* is greater than the upper limit value Pmc(max) of the voltage boosting converter 21.

When the result of the determination indicates that the target power operation quantity Pm* is not greater than the upper limit value Pmc(max) of the voltage boosting converter 21, that is, when the result of the determination indicates that the target power operation quantity Pm* can be implemented by using only the voltage boosting converter 21, the voltage boosting converter 21 is selected to serve as an object of the control to stabilize variations in the system voltage. In this case, both the first target input power operation quantity Pm1* of the first MG unit 29 and the second target input power operation quantity Pm2* of the second MG unit 30 are set at 0.

When the result of the determination indicates that the target power operation quantity Pm* is greater than the upper limit value Pmc(max) of the voltage boosting converter 21, that is, when the result of the determination indicates that the target power operation quantity Pm* cannot be implemented by using only the voltage boosting converter 21, on the other hand, the voltage boosting converter 21 is selected to serve as an object of the control to stabilize variations in the system voltage in conjunction with either of the first MG unit 29 and the second MG unit 30 or both of them.

In this case, the target output power operation quantity Pmc* of the voltage boosting converter 21 is set at the upper limit value Pmc(max) of the voltage boosting converter 21 and the target output power operation quantity Pmc* of the voltage boosting converter 21 is compensated for a shortage of PPm* [=Pm*−Pmc(max)] from the target power operation quantity Pm* by setting the first target input power operation quantity Pm1* of the first MG unit 29 and the second target input power operation quantity Pm2* of the second MG unit 30 as follows.

When the first limit value Pmc1(max) of the first MG unit 29 and the second limit value Pmc2(max) of the second MG unit 30 are both greater than the shortage PPm* from the target power operation quantity Pm*, either of the first MG unit 29 and the second MG unit 30 can be used to compensate the target output power operation quantity Pmc* of the voltage boosting converter 21 for the shortage PPm*. In this case, the MG unit having a greater heat margin hc is selected to serve as an object of the control to stabilize variations in the system voltage and the target input power operation quantity of the selected MG unit is set at the shortage PPm* from the target power operation quantity Pm*.

When only either the first limit value Pmc1(max) of the first MG unit 29 or the second limit value Pmc2(max) of the second MG unit 30 is greater than the shortage PPm* from the target power operation quantity Pm*, the MG unit having an input power operation quantity upper limit value greater than the shortage PPm* can be used to compensate the target output power operation quantity Pmc* of the voltage boosting converter 21 for the shortage PPm*. In this case, the MG unit having an input power operation quantity upper limit value greater than the shortage PPm* is selected to serve as an object of the control to stabilize variations in the system voltage and the target input power operation quantity of the selected MG unit is set at the shortage PPm* from the target power operation quantity Pm*.

When both the first limit value Pmc1(max) of the first MG unit 29 and the second limit value Pmc2(max) of the second MG unit 30 are not greater than the shortage PPm* from the target power operation quantity Pm*, with only either of the first MG unit 29 and the second MG unit 30, the target output power operation quantity Pmc* of the voltage boosting converter 21 cannot be compensated for the shortage PPm*. In this case, both the first MG unit 29 and the second MG unit 30 are each selected to serve as an object of the control to stabilize variations in the system voltage. In addition, the first target input power operation quantity Pm1* of the first MG unit 29 and the second target input power operation quantity Pm2* of the second MG unit 30 are set at values the sum of which are equal to the shortage PPm* from the target power operation quantity Pm*. Particularly, the target input power operation quantity of the MG unit having a greater heat margin hc is set at a value greater than a value at which the target input power operation quantity of the target input power operation quantity of the other MG unit is set.

As described above, the MG select coordination control unit 69 selects the first MG unit 29, the second MG unit 30 and/or the voltage boosting converter 21 each to serve as an object of the control to stabilize the system voltage, setting each of the first target input power operation quantity Pm1* of the first MG unit 29, the second target input power operation quantity Pm2* of the second MG unit 30 and the target output power operation quantity Pmc* of the voltage boosting converter 21 at a proper value. Then, as shown in FIG. 10, the MG select coordination control unit 69 supplies the first target input power operation quantity Pm1* of the first MG unit 29 to the first command current computation unit 70, the second target input power operation quantity Pm2* of the second MG unit 30 to the second command current computation unit 71 and the target output power operation quantity Pmc* of the voltage boosting converter 21 to an adder 87.

As shown in FIG. 5, the first command current computation unit 70 computes the power control current vector ip1* (including the d-axis power control current vector idp1* and the q-axis power control current vector iqp1*) for changing the reactive power not contributing anything to the generation of a torque in the first AC motor 13 by the first target input power operation quantity Pm1* of the first MG unit 29 as follows.

First of all, the d-axis power control current vector idp1* is computed on the basis of the first target input power operation quantity Pm1* of the first MG unit 29 and the first torque control current vector it1* (including the d-axis torque control current vector idt1* and the q-axis torque control current vector iqt1*) by using map data, a mathematical equation or the like.

Subsequently, the q-axis power control current vector iqp1* is computed on the basis of the d-axis power control current vector idp1* in accordance with the following equation:

$$iqp1^*=(Ld-Lq) \times idp1^* \times iqt1^* / \{\phi+(Ld-Lq)\times(idp1^*+iqt1^*)\}$$

where notations $\phi$, Ld and Lq denote respectively a flux linkage, a d-axis inductance and a q-axis inductance, which are machine constants of the first AC motor 13.

In this way, the first command current computation unit 70 computes the power control current vector ip1* (including the d-axis power control current vector idp1* and the q-axis power control current vector iqp1*) for changing the input power (that is, the reactive power) of the first AC motor 13 by the first target input power operation quantity Pm1* of the first MG unit 29 while sustaining the torque generated in the first AC motor 13 at a constant value, that is, the torque command value T1*.

Then, the first command current computation unit 70 combines the first torque control current vector it1* (including the d-axis torque control current vector idt1* and the q-axis torque control current vector iqt1*) with the first power control current vector ip1* (including the d-axis power control current vector idp1* and the q-axis power control current vector iqp1*) to result in the final first command current vector i1* (including the d-axis command current vector id1* and the q-axis command current vector iq1*) as expressed by the following equation:

$$i1^*(id1^*,iq1^*)=it1^*(idt1^*,iqt1^*)+ip1^*(idp1^*,iqp1^*)$$

It is to be noted that with the first target input power operation quantity Pm1* of the first MG unit 29 set at 0, the first command current computation unit 70 outputs the first torque control current vector it1* (including the d-axis torque control current vector idt1* and the q-axis torque control current vector iqt1*) as the final first command current vector i1* (including the d-axis command current vector id1* and the q-axis command current vector iq1*) as expressed by the following equation:

$$i1^*(id1^*,iq1^*)=it1^*(idt1^*,iqt1^*)$$

On the basis of the first torque control current vector i1*, the first current vector control unit 47 computes three-phase voltage command signals UU1, UV1 and UW1, outputting the three-phase voltage command signals UU1, UV1 and UW1 to the three-phase first inverter 27. In this way, the input power of the first AC motor 13 can be changed by the first target input power operation quantity Pm1* of the first MG unit 29, while the torque generated in the first AC motor 13 is being sustained at a constant value, that is, the torque command value T1*.

At the same time, in the same way as the first command current computation unit 70, the second command current computation unit 71 computes the power control current vector ip2* (including the d-axis power control current vector idp2* and the q-axis power control current vector iqp2*) for changing the reactive power not contributing anything to the generation of a torque in the second AC motor 14 by the second target input power operation quantity Pm2* of the second MG unit 30, while sustaining the torque generated in the second AC motor 14 at a constant value, that is, the torque command value T2*. Then, the second command current computation unit 71 combines the second torque control current vector it2* (including the d-axis torque control current vector idt2* and the q-axis torque control current vector iqt2*) with the second power control current vector ip2* (including the d-axis power control current vector idp2* and the q-axis power control current vector iqp2*) to result in the final second command current vector i2* (including the d-axis command current vector id2* and the q-axis command current vector iq2*) as expressed by the following equation:

$$i2^*(id2^*,iq2^*)=it2^*(idt2^*,iqt2^*)+ip2^*(idp2^*,iqp2^*)$$

It is to be noted that with the second target input power operation quantity Pm2* of the second MG unit 30 set at 0, the second command current computation unit 71 outputs the second torque control current vector it2* as the final second command current vector i2* as expressed by the following equation:

$$i2*(id2*, iq2*) = it2*(idt2*, iqt2*)$$

On the basis of the second torque control current vector i2*, the second current vector control unit 55 computes three-phase voltage command signals UU2, UV2 and UW2, outputting the three-phase voltage command signals UU2, UV2 and UW2 to the three-phase second inverter 28. In this way, the input power of the second AC motor 14 can be changed by the second target input power operation quantity Pm2* of the second MG unit 30 while the torque generated in the second AC motor 14 is being sustained at a constant value, that is, the torque command value T2*.

In addition, an adder 87 adds the target output power operation quantity Pmc* of the voltage boosting converter 21 to the total power Pif* obtained as a result of the low pass filtering process to produce the final command value Pif* (=Pif*+Pmc*) of the conversion power. On the basis of the final command value Pif* of the conversion power, the voltage boosting driving signal computation unit 68 generates voltage boosting driving signals UCU and UCL, outputting the voltage boosting driving signals UCU and UCL to the voltage boosting converter 21 to change the output power of the voltage boosting converter 21 by the target output power operation quantity Pmc*.

By carrying out the processing, the target output power operation quantity Pm* is set at such a value that the difference ΔVs between the target value Vs* and detected value Vsf of the system voltage is reduced. Then, the input power of the first MG unit 29, the input power of the second MG unit 30 and the output power of the voltage boosting converter 21 are adjusted to implement the target output power operation quantity Pmc* in execution of the system voltage stabilization control to suppress variations in the system voltage. In this processing, components such as the P-I controller 53, the first command current computation unit 70, the second command current computation unit 71, the first current vector control unit 47, the second current vector control unit 55, the adder 87 and the voltage boosting driving signal computation unit 68 together function as a system voltage control means.

Figure 12:
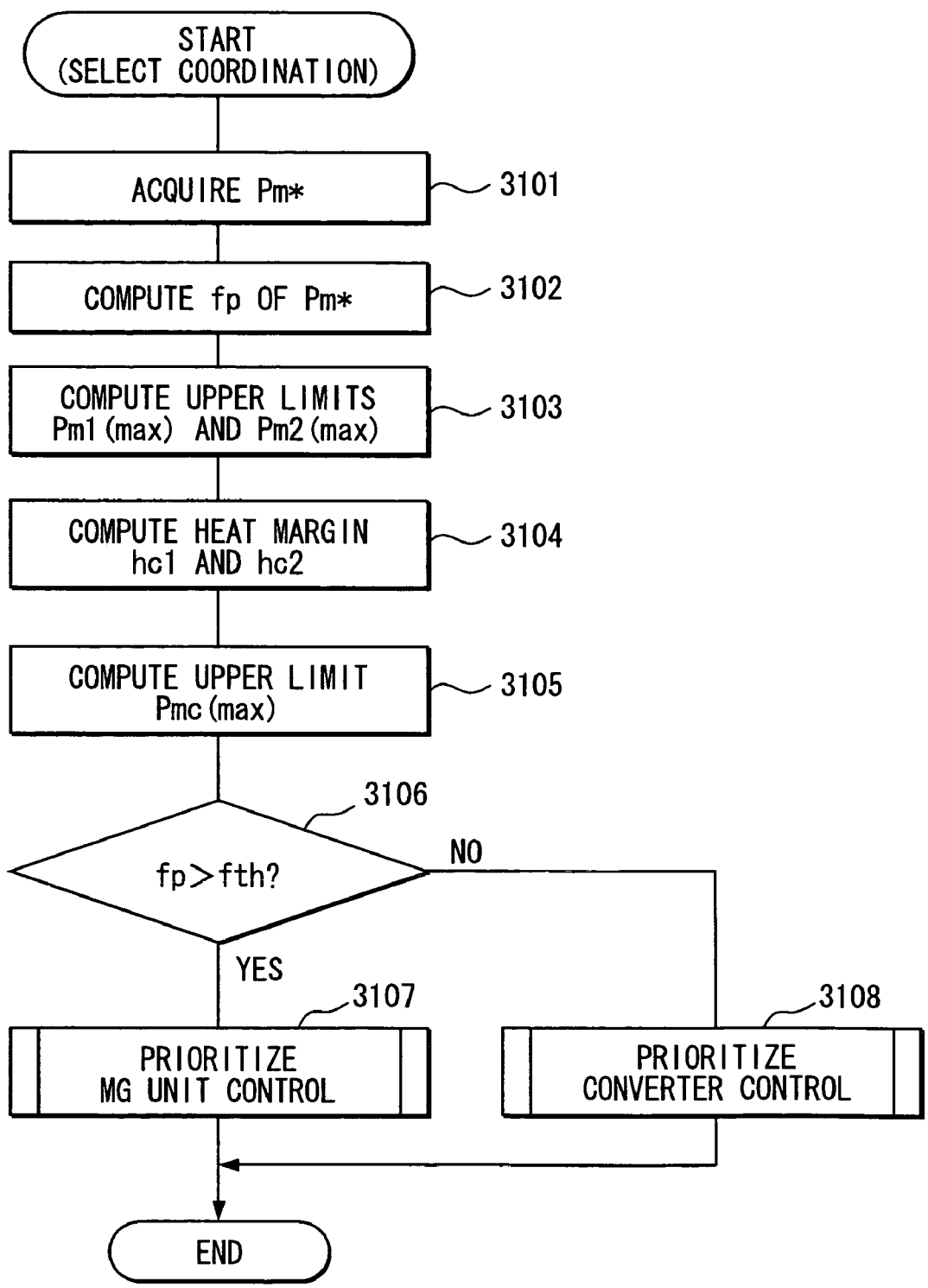
FIG. 12 is a flowchart showing a program executed to carry out the coordination control to select MG units.
Figure 13:
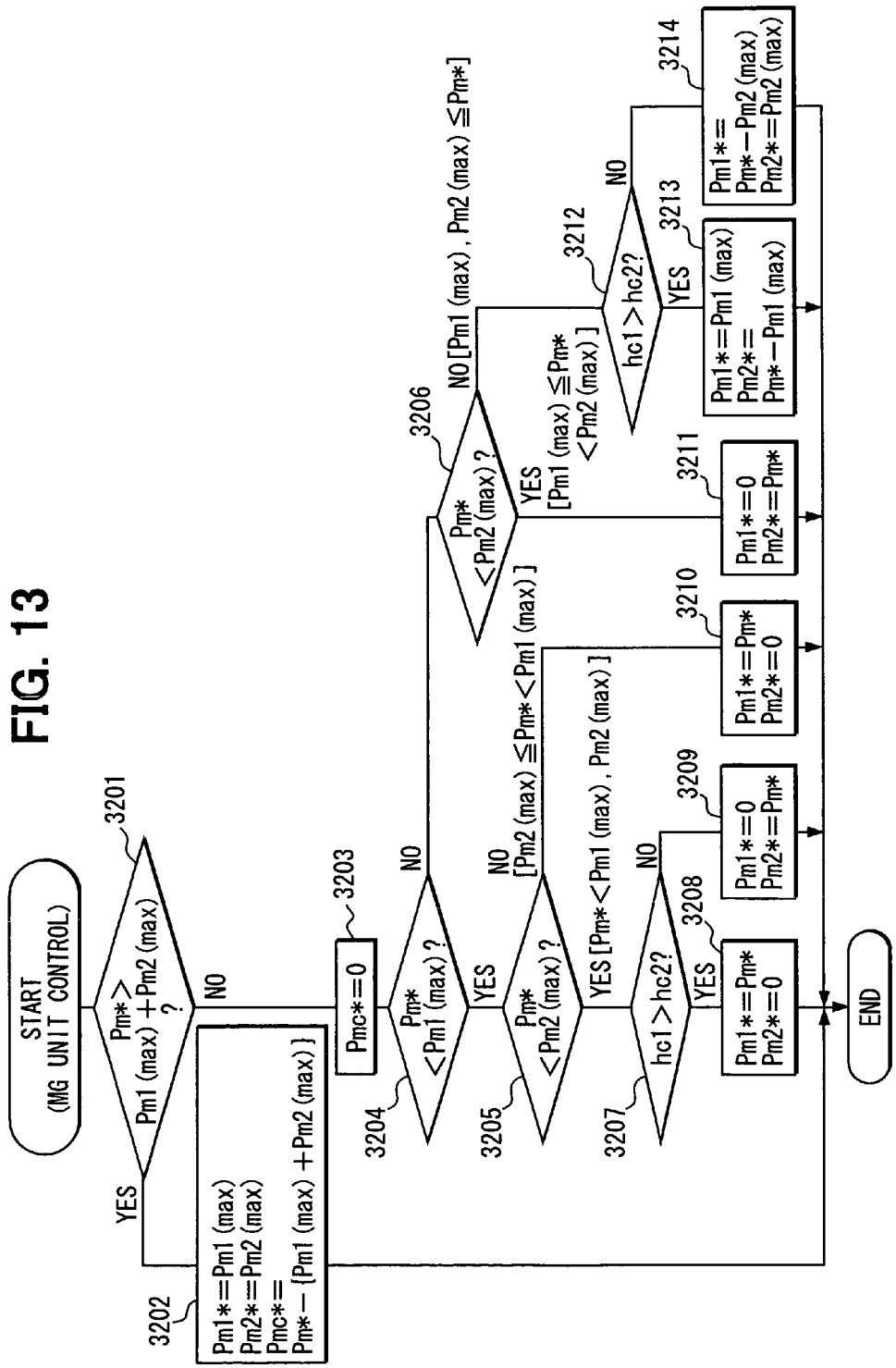
FIG. 13 is a flowchart showing a program executed to carry out MG-unit prioritizing control.
Figure 14:
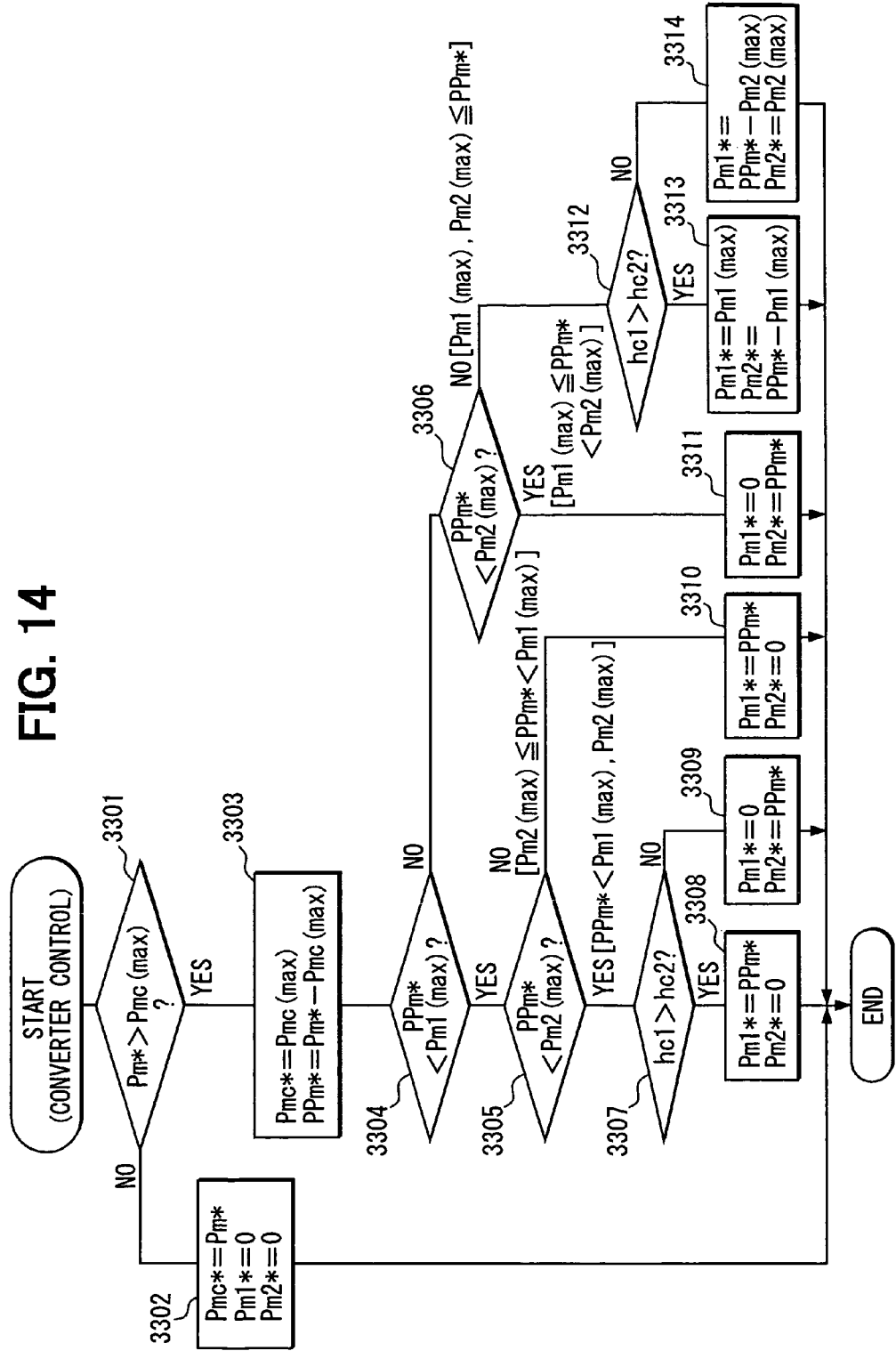
FIG. 14 is a flowchart showing a program executed to carry out voltage boosting converter prioritizing control.

The coordination control to select the first MG unit 29, the second MG unit 30 and the voltage boosting converter 21 as described above is implemented by execution of programs represented by flowcharts shown in FIGS. 12 to 14.

Referring to FIG. 12, the select coordination control to select the first MG unit 29, the second MG unit 30 and the voltage boosting converter 21 begins with step 3101, at which the target power operation quantity Pm* is acquired. Then, at next step 3102, the frequency fp of the target power operation quantity Pm* is computed. As described above, the frequency of the target power operation quantity Pm* is information on the frequency of the variation in the system voltage.

Then, at next step 3103, the present torque command value T1* and present rotation speed N1 of the first AC motor 13 are used for computing the first upper limit value Pm1(max), that is, the allowable upper limit value of the input power, of the first MG unit 29 in accordance with map data, a mathematical equation or the like. Similarly, the present torque command value T2* and present rotation speed N2 of the second AC motor 14 are used for computing the second upper limit value Pm2(max), that is, the allowable upper limit value of the input power, of the second MG unit 30 in accordance with map data, a mathematical equation or the like. The first upper limit value Pm1(max) of the first MG unit 29 is determined by a maximum current, maximum voltage and torque command value of the first AC motor 13. Similarly, the second upper limit value Pm2(max) of the second MG unit 30 is determined by a maximum current, maximum voltage and torque command value of the second AC motor 14. The maximum currents of the first AC motor 13 and the second AC motor 14 are determined by the characteristics of the first and second inverters 27 and 28 respectively. On the other hand, the maximum voltage of the first AC motor 13 is determined by the maximum current and rotation speed N1 of the first AC motor 13, whereas the maximum voltage of the second AC motor 14 is determined by the maximum current and rotation speed N2 of the second AC motor 14. Thus, the first upper limit value Pm1(max) of the first MG unit 29 can be determined precisely on the basis of the present torque command value T1* and present rotation speed N1 of the first AC motor 13. Similarly, the second upper limit value Pm2(max) of the second MG unit 30 can be determined precisely on the basis of a present torque command value T2* and present rotation speed N2 of the second AC motor 14.

Then, at next step 3104, in accordance with the present temperature to of the first AC motor 13, the first heat margin hc1 (defined as the maximum of an allowable heat dissipation quantity not causing an overheated state) of the first MG unit 29 is computed by using map data, a mathematical equation or the like. Similarly, in accordance with the present temperature t2 of the second AC motor 14, the second heat margin hc2 (defined as the maximum of an allowable heat dissipation quantity not causing an overheated state) of the second MG unit 30 is computed by using map data, a mathematical equation or the like. The first heat margin hc1 of the first MG unit 29 changes in accordance with the temperature t1, tolerable heat dissipation temperature and thermal capacity of the first AC motor 13 and, similarly, the second heat margin hc2 of the second MG unit 30 changes in accordance with the temperature t2, tolerable heat dissipation temperature and thermal capacity of the second AC motor 14. The tolerable heat dissipation temperature and thermal capacity of the first AC motor 13 are determined by specifications of the first AC motor 13, whereas the tolerable heat dissipation temperature and thermal capacity of the second AC motor 14 are determined by specifications of the second AC motor 14. Thus, the first heat margin hc1 of the first MG unit 29 can be computed precisely in accordance with the present temperature to of the first AC motor 13, whereas the second heat margin hc2 of the second MG unit 30 can be computed precisely in accordance with the present temperature t2 of the second AC motor 14.

Then, at next step 3015, the conduction duty ratio Dc of the voltage boosting converter 21, the voltage V20 and the charge condition C20 of the DC power supply 20 are used as a basis for computing the output power operation quantity upper limit value Pmc(max), that is, the allowable upper limit value of the output power, of the voltage boosting converter 21 by using map data, a mathematical equation or the like. This is because the upper limit value Pmc(max) of the voltage boosting converter 21 varies in accordance with the conduction duty ratio Dc of the voltage boosting converter 21, the voltage V20 and the charge condition C20 of the DC power supply 20. Thus, on the basis of the conduction duty ratio Dc of the voltage boosting converter 21, the voltage V20 and the charge condition C20 of the DC power supply 20, the upper limit value Pmc(max) of the voltage boosting converter 21 can be computed.

Then, at next step 3016, the frequency fp, that is, information on the frequency of the variation in the system voltage, of the target power operation quantity Pm* is compared with a reference value fth to produce a result of determination as to whether or not the frequency fp is higher than the reference value fth. When the result of the determination indicates that the frequency fp of the target power operation quantity Pm* is higher than the reference value fth, the frequency of the variation in the system voltage is regarded to be high. In this case the processing proceeds to step 3107 to execute an MG-unit prioritizing control program (FIG. 13). Since the first MG unit 29 and the second MG unit 30 are suitable for suppressing high frequency variations in the system voltage, the MG-unit prioritizing control program gives priority to the first MG unit 29 and the second MG unit 30 in selecting an object of the control to stabilize the system voltage.

When the determination result of step 3106 indicates that the frequency fp of the target power operation quantity Pm* is not higher than the reference value fth, on the other hand, the frequency of the variation in the system voltage is regarded to be low. In this case the processing proceeds to step 3108 to execute a voltage boosting converter prioritizing control program (FIG. 14). Since the voltage boosting converter 21 is suitable for suppressing low frequency variations in the system voltage, the voltage boosting converter prioritizing control program gives priority to the voltage boosting converter 21 in selecting an object of the control to stabilize the system voltage.

The MG-unit prioritizing control program represented by the flowchart shown in FIG. 13 begins with step 3201 at which the sum of the first limit value Pm1(max) of the first MG unit 29 and the second limit value Pm2(max) of the second MG unit 30 is compared with the target power operation quantity Pm* to produce a result of determination as to whether or not the target power operation quantity Pm* is not greater than a sum of {Pm1(max)+Pm2(max)}, that is, to produce a result of determination as to whether or not the target power operation quantity Pm* can be implemented by selecting only the first MG unit 29 and the second MG unit 30.

When the result of the determination indicates that the target power operation quantity Pm* is greater than {Pm1(max)+Pm2(max)} representing the sum of the first limit value Pm1(max) and the second limit value Pm2(max), that is, when the result of the determination indicates that the target power operation quantity Pm* cannot be implemented by selecting only both the first MG unit 29 and the second MG unit 30, the first MG unit 29, the second MG unit 30 and the voltage boosting converter 21 are all selected as three means for executing the control to stabilize the system voltage. In this case, the processing proceeds to step 3202 at which the first target input power operation quantity Pm1* of the first MG unit 29 is set at the first limit value Pm1(max), the second target input power operation quantity Pm2* of the second MG unit 30 is set at the second limit value Pm2(max) and the target output power operation quantity Pmc* of the voltage boosting converter 21 is set at a difference of [Pm*−{Pm1(max)+Pm2(max)}] to compensate the target input power operation quantities Pm1* and Pm2* for a shortage of {Pm*−(Pm1(max)+Pm2(max))} from the target power operation quantity Pm*.

The process carried out at step 3202 is represented by the following expressions:

$Pm1*=Pm1(\text{max})$ $Pm2*=Pm2(\text{max})$ $Pmc*=\{Pm*-(Pm1(\text{max})+Pm2(\text{max}))\}$ When the determination result of step 3201 indicates that the target power operation quantity Pm* is not greater than {Pm1(max)+Pm2(max)} representing the sum of the first limit value Pm1(max) and the second limit value Pm2(max), that is, when the determination result of step 3201 indicates that the target power operation quantity Pm* can be implemented by selecting only either one or both of the first MG unit 29 and the second MG unit 30, on the other hand, either one or both of the first MG unit 29 and the second MG unit 30 are selected as a means for executing the control to stabilize the system voltage. In this case, the processing proceeds to step 3203.

First of all, at step 3203, the target output power operation quantity Pmc* of the voltage boosting converter 21 is set at 0 as represented by the following expression: Pmc*=0.

Then, at subsequent steps 3204, 3205 and 3206, the target input power operation quantity Pm* is compared with the first limit value Pm1(max) of the first MG unit 29 and with the second limit value Pm2(max) of the second MG unit 30 to produce a determination result as to whether or not the target input power operation quantity Pm* is greater than the first limit value Pm1(max) and a determination result as to whether or not the target input power operation quantity Pm* is greater than the second limit value Pm2(max). Then, in accordance with the determination results, the following control is executed.

[1] When the determination results indicate that Pm*<Pm1(max) and Pm*<Pm2(max), that is, when the determination results indicate that both the first limit value Pm1(max) of the first MG unit 29 and the second limit value Pm2(max) of the second MG unit 30 are greater than the target input power operation quantity Pm*, that is, when the determination results indicate that the target input power operation quantity Pm* can be implemented by selecting only either of the first MG unit 29 and the second MG unit 30, the processing proceeds to step 3207 at which an MG unit having a heat margin hc greater than the heat margin hc of the other MG unit is recognized as an MG unit to be selected as an object of the control to stabilize the system voltage. That is, at step 3207, the first heat margin hc1 of the first MG unit 29 is compared with the second heat margin hc2 of the second MG unit 30 to produce a result of determination as to whether or not the first heat margin hc1 is greater than the second heat margin hc2.

When the determination result of step 3207 indicates that the first heat margin hc1 of the first MG unit 29 is greater than the second heat margin hc2 of the second MG unit 30, that is, when the result of the determination indicates the relation hc1>hc2, the processing proceeds to step 3208 at which the first MG unit 29 having the first heat margin hc1 greater than the second heat margin hc2 of the second MG unit 30 is selected to serve as the object of the control to stabilize the system voltage. In addition, the first target input power operation quantity Pm1* of the selected first MG unit 29 is set at the target input power operation quantity Pm*. It is to be noted that, in this case, the second target input power operation quantity Pm2* of the second MG unit 30 is set at 0. That is, Pm1*=Pm* and Pm2*=0.

When the determination result of step 3207 indicates that the first heat margin hc1 of the first MG unit 29 is not greater than the second heat margin hc2 of the second MG unit 30, that is, when the result of the determination indicates the relation hc1≦hc2, on the other hand, the processing proceeds to step 3209 at which the second MG unit 30 having the second heat margin hc2 at least equal to the first heat margin hc1 of the first MG unit 29 is selected to serve as the object of the control to stabilize the system voltage. In addition, the second target input power operation quantity Pm2* of the selected second MG unit 30 is set at the target input power operation quantity Pm*. It is to be noted that, in this case, the first target input power operation quantity Pm1* of the first MG unit 29 is set at 0 as follows.

$Pm1*=0$ $Pm2*=Pm*.$

[2] When the determination results of steps 3204 to 3206 indicate that Pm2(max)≦Pm*<Pm1(max), that is, when the determination results indicate that only the first limit value Pm1(max) of the first MG unit 29 is greater than the target input power operation quantity Pm*, the processing proceeds to step 3210 at which the first MG unit 29 having the first limit value Pm1(max) greater than the target input power operation quantity Pm* is selected to serve as the object of the control to stabilize the system voltage. In addition, the first target input power operation quantity Pm1* of the selected first MG unit 29 is set at the target input power operation quantity Pm*. It is to be noted that, in this case, the second target input power operation quantity Pm2* of the second MG unit 30 is set at 0. That is, $Pm1*=Pm*$ $Pm2*=0.$

[3] When the determination results of steps 3204 to 3206 indicate that Pm1(max)≦Pm*<Pm2(max), that is, when the determination results indicate that only the second limit value Pm2(max) of the second MG unit 30 is greater than the target input power operation quantity Pm*, the processing proceeds to step 3211 at which the second MG unit 30 having the second limit value Pm2(max) greater than the target input power operation quantity Pm* is selected to serve as the object of the control to stabilize the system voltage. In addition, the second target input power operation quantity Pm2* of the selected first MG unit 30 is set at the target input power operation quantity Pm*. It is to be noted that, in this case, the first target input power operation quantity Pm1* of the first MG unit 29 is set at 0. That is, $Pm1*=0$ $Pm2*=Pm*.$

[4] When the determination results of steps 3204 to 3206 indicate that Pm1(max)≦Pm* and Pm2(max)≦Pm*, that is, when the determination results indicate that both the first limit value Pm1(max) of the first MG unit 29 and the second limit value Pm2(max) of the second MG unit 30 are not greater than the target input power operation quantity Pm*, the determination results suggest that the target input power operation quantity Pm* cannot be implemented by merely selecting only either of the first MG unit 29 and the second MG unit 30. Thus, the first MG unit 29 and the second MG unit 30 are each selected to serve as an object of the control to stabilize the system voltage.

In this case, the processing proceeds to step 3212 at which the first heat margin hc1 of the first MG unit 29 is compared with the second heat margin hc2 of the second MG unit 30 to produce a result of determination as to whether or not the first heat margin hc1 is greater than the second heat margin hc2. When the determination result of step 3212 indicates that the first heat margin hc1 of the first MG unit 29 is greater than the second heat margin hc2 of the second MG unit 30, that is, when the result of the determination indicates the relation hc1>hc2, the processing proceeds to step 3213 at which the first target input power operation quantity Pm1* of the first MG unit 29 having the first heat margin hc1 greater than the second heat margin hc2 of the second MG unit 30 is set at the input power operation quantity Pm1(max). On the other hand, the second target input power operation quantity Pm2* of the second MG unit 30 having the second heat margin hc2 smaller than the first heat margin hc1 of the first MG unit 29 is set at a difference between the input power operation quantity upper limit Pm1(max) and the target input power operation quantity Pm* as follows.

$Pm1*=Pm1(max)$ $Pm2*=Pm*-Pm1(max).$

Thus, the sum of the first target input power operation quantity Pm1* of the first MG unit 29 and the second target input power operation quantity Pm2* of the second MG unit 30 is equal to the target input power operation quantity Pm*. In addition, the first target input power operation quantity Pm1* of the first MG unit 29 is set at the input power operation quantity upper limit Pm1(max) greater than the difference of (Pm*-Pm1(max)) at which the second target input power operation quantity Pm2* of the second MG unit 30 is set.

When the determination result of step 3212 indicates that the first heat margin hc1 of the first MG unit 29 is not greater than the second heat margin hc2 of the second MG unit 30, that is, when the result of the determination indicates the relation hc1≦hc2, on the other hand, the processing proceeds to step 3214 at which the second target input power operation quantity Pm2* of the second MG unit 30 having the second heat margin hc2 at least equal to the first heat margin hc1 of the first MG unit 29 is set at the input power operation quantity Pm2(max). On the other hand, the first target input power operation quantity Pm1* of the first MG unit 29 having the first heat margin hc1 not greater than the second heat margin hc2 of the second MG unit 30 is set at a difference between the input power operation quantity upper limit Pm2(max) and the target input power operation quantity Pm* as follows.

$Pm1*=Pm*-Pm2(max)$ $Pm2*=Pm2(max)$

Thus the sum of the first target input power operation quantity Pm1* of the first MG unit 29 and the second target input power operation quantity Pm2* of the second MG unit 30 is equal to the target input power operation quantity Pm*. In addition, the second target input power operation quantity Pm2* of the second MG unit 30 is set at the input power operation quantity upper limit Pm2(max) greater than the difference of (Pm*-Pm2(max)) at which the first target input power operation quantity Pm1* of the first MG unit 29 is set.

The voltage boosting converter prioritizing control program shown in FIG. 14 is a subroutine executed at step 3108 of the main program of FIG. 12. This voltage boosting converter prioritizing control program begins with step 3301 at which the upper limit value Pmc(max) of the voltage boosting converter 21 is compared with the target input power operation quantity Pm* to produce a result of determination as to whether or not the target input power operation quantity Pm* is greater than the upper limit value Pmc(max), that is, to produce a result of determination as to whether or not the target input power operation quantity Pm* can be implemented by using only the voltage boosting converter 21 as an object of the control to stabilize the system voltage.

When the result of the determination indicates that the upper limit value Pmc(max) is equal to or greater than the target output power operation quantity Pmc*, that is, when the result of the determination indicates that the target input power operation quantity Pm* can be implemented by using only the voltage boosting converter 21, the voltage boosting converter 21 is selected to serve as an object of the control to stabilize the system voltage. In this case, the processing proceeds to step 3302 at which the target output power operation quantity Pmc* of the voltage boosting converter 21 is set at the target input power operation quantity Pm*, whereas the first target input power operation quantity Pm1* of the first MG unit 29 and the second target input power operation quantity Pm2* of the first MG unit 30 are each set at 0 as represented by the following expressions:

$$Pmc^* = Pm^*$$

$$Pm1^* = 0$$

$$Pm2 = 0$$

When the determination result of step 3301 indicates that the upper limit value Pmc(max) is smaller than the target output power operation quantity Pmc*, that is, when the result of the determination indicates that the target input power operation quantity Pm* cannot be implemented by using only the voltage boosting converter 21, the voltage boosting converter 21 and either one or both of the first MG unit 29 and the second MG unit 30 are each selected to serve as a means for executing the control to stabilize the system voltage.

In this case, first of all, the processing proceeds to step 3303 at which the target output power operation quantity Pmc* of the voltage boosting converter 21 is set at the upper limit value Pmc(max) of the voltage boosting converter 21, and the upper limit value Pmc(max) is subtracted from the target input power operation quantity Pm* to produce a difference of {Pm*−Pmc(max)} as a shortage PPm* from the target input power operation quantity Pm* as follows:

$$Pmc^* = Pmc(\text{max})$$

$$Ppm^* = Pm^* - Pmc(\text{max})$$

Then, at next steps 3304 to 3306, the shortage PPm* from the target input power operation quantity Pm* is compared with the first limit value Pm1(max) of the first MG unit 29 and with the second limit value Pm2(max) of the second MG unit 30 to produce a determination result as to whether or not the shortage PPm* is greater than the first limit value Pm1(max) and a determination result as to whether or not the shortage PPm* is greater than the second limit value Pm2(max). Then, in accordance with the determination results, the first target input power operation quantity Pm1* of the first MG unit 29 and the second target input power operation quantity Pm2* of the first MG unit 30 are set as follows.

[1] When the determination results indicate that PPm*<Pm1(max) and PPm*<Pm2(max), that is, when the determination results indicate that both the first limit value Pm1(max) of the first MG unit 29 and the second limit value Pm2(max) of the second MG unit 30 are greater than the shortage PPm* from the target input power operation quantity Pm*, the determination results are considered to indicate the shortage PPm* can be implemented by selecting only either of the first MG unit 29 and the second MG unit 30. In this case, the processing proceeds to step 3307 at which an MG unit having the heat margin hc greater than the heat margin hc of the other MG unit is recognized as an MG unit to be selected as an object of the control to stabilize the system voltage. That is, at step 3307, the first heat margin hc1 of the first MG unit 29 is compared with the second heat margin hc2 of the second MG unit 30 to produce a result of determination as to whether or not the first heat margin hc1 is greater than the second heat margin hc2.

When the determination result of step 3307 indicates that the first heat margin hc1 of the first MG unit 29 is greater than the second heat margin hc2 of the second MG unit 30, that is, when the result of the determination indicates the relation hc1>hc2, the processing proceeds to step 3308 at which the first MG unit 29 having the first heat margin hc1 greater than the second heat margin hc2 of the second MG unit 30 is selected to serve as the object of the control to stabilize the system voltage. In addition, the first target input power operation quantity Pm1* of the selected first MG unit 29 is set at the shortage PPm* from the target input power operation quantity Pm*. It is to be noted that, in this case, the second target input power operation quantity Pm2* of the second MG unit 30 is set at 0. That is, Pm1*=PPm* and Pm2*=0.

When the determination result of step 3307 indicates that the first heat margin hc1 of the first MG unit 29 is not greater than the second heat margin hc2 of the second MG unit 30, that is, when the result of the determination indicates the relation hc1≦hc2, on the other hand, the processing proceeds to step 3309 at which the second MG unit 30 having the second heat margin hc2 at least equal to the first heat margin hc1 of the first MG unit 29 is selected to serve as the object of the control to stabilize the system voltage. In addition, the second target input power operation quantity Pm2* of the selected second MG unit 30 is set at the shortage PPm* from the target input power operation quantity Pm*. It is to be noted that, in this case, the first target input power operation quantity Pm1* of the first MG unit 29 is set at 0 as follows.

$$Pm1^* = 0$$

$$Pm2^* = PPm^*$$

[2] When the determination results of steps 3304 to 3306 indicate that Pm2(max)≦PPm*<Pm1(max), that is, when the determination results indicate that only the first limit value Pm1(max) of the first MG unit 29 is greater than the shortage PPm* from the target input power operation quantity Pm*, the processing proceeds to step 3310 at which the first MG unit 29 having the first limit value Pm1(max) greater than the shortage PPm* is selected to serve as the object of the control to stabilize the system voltage. In addition, the first target input power operation quantity Pm1* of the selected first MG unit 29 is set at the shortage PPm* from the target input power operation quantity Pm*. It is to be noted that, in this case, the second target input power operation quantity Pm2* of the second MG unit 30 is set at 0. That is, Pm1*=PPm* and Pm2*=0.

[3] When the determination results of steps 3304 to 3306 indicate that Pm1(max)≦PPm*<Pm2(max), that is, when the determination results indicate that only the second limit value Pm2(max) of the second MG unit 30 is greater than the shortage PPm* from the target input power operation quantity Pm*, the processing proceeds to step 3311 at which the second MG unit 30 having the second limit value Pm2(max) greater than the shortage PPm* is selected to serve as the object of the control to stabilize the system voltage. In addition, the second target input power operation quantity Pm2* of the selected first MG unit 30 is set at the shortage PPm* from the target input power operation quantity Pm*. It is to be noted that, in this case, the first target input power operation quantity Pm1* of the first MG unit 29 is set at 0. That is, Pm1*=0 and Pm2*=PPm*.

[4] When the determination results of steps 3304 to 3306 indicate that Pm1(max)≦PPm* and Pm2(max)≦PPM*, that is, when the determination results indicate that both the first limit value Pm1(max) of the first MG unit 29 and the second limit value Pm2(max) of the second MG unit 30 are not greater than the shortage PPm* from the target input power operation quantity Pm*, the determination results are considered to indicate that the shortage PPm* from the target input power operation quantity Pm* cannot be implemented by merely selecting only either of the first MG unit 29 and the second MG unit 30. Thus, the first MG unit 29 and the second MG unit 30 are each selected to serve as an object of the control to stabilize the system voltage.

In this case, the processing proceeds to step 3312 at which the first heat margin hc1 of the first MG unit 29 is compared with the second heat margin hc2 of the second MG unit 30 to produce a result of determination as to whether or not the first heat margin hc1 is greater than the second heat margin hc2. When the determination result of step 3312 indicates that the first heat margin hc1 of the first MG unit 29 is greater than the second heat margin hc2 of the second MG unit 30, that is, when the result of the determination indicates the relation hc1>hc2, the processing proceeds to step 3313 at which the first target input power operation quantity Pm1* of the first MG unit 29 having the first heat margin hc1 greater than the second heat margin hc2 of the second MG unit 30 is set at the input power operation quantity Pm1(max). On the other hand, the second target input power operation quantity Pm2* of the second MG unit 30 having the second heat margin hc2 smaller than the first heat margin hc1 of the first MG unit 29 is set at a difference between the input power operation quantity upper limit Pm1(max) and the shortage PPm* from the target input power operation quantity Pm* as follows.

$$Pm1^* = Pm1(\text{max})$$

$$Pm2^* = PPm^* - Pm1(\text{max})$$

Thus the sum of the first target input power operation quantity Pm1* of the first MG unit 29 and the second target input power operation quantity Pm2* of the second MG unit 30 is equal to the shortage PPm* from the target input power operation quantity Pm*. In addition, the first target input power operation quantity Pm1* of the first MG unit 29 is set at the input power operation quantity upper limit Pm1(max) greater than the difference of (PPm*−Pm1(max)) at which the second target input power operation quantity Pm2* of the second MG unit 30 is set.

When the determination result of step 3312 indicates that the first heat margin hc1 of the first MG unit 29 is not greater than the second heat margin hc2 of the second MG unit 30, that is, when the result of the determination indicates the relation hc1≦hc2, on the other hand, the processing proceeds to step 3314 at which the second target input power operation quantity Pm2* of the second MG unit 30 having the second heat margin hc2 at least equal to the first heat margin hc1 of the first MG unit 29 is set at the input power operation quantity Pm2(max). On the other hand, the first target input power operation quantity Pm1* of the first MG unit 29 having the first heat margin hc1 not greater than the second heat margin hc2 of the second MG unit 30 is set at a difference between the input power operation quantity upper limit Pm2(max) and the shortage PPm* from the target input power operation quantity Pm* as follows.

$$Pm1^* = PPm^* - Pm2(\text{max})$$

$$Pm2^* = Pm2(\text{max})$$

Thus the sum of the first target input power operation quantity Pm1* of the first MG unit 29 and the second target input power operation quantity Pm2* of the second MG unit 30 is equal to the shortage PPm* from the target input power operation quantity Pm*. In addition, the second target input power operation quantity Pm2* of the second MG unit 30 is set at the input power operation quantity upper limit Pm2 (max) greater than the difference of (PPm*−Pm2(max)) at which the first target input power operation quantity Pm1* of the first MG unit 29 is set.

In the case of the third embodiment described above, the system voltage stabilization control of suppressing variations in the system voltage, which is a voltage appearing on the power supply line 22, is executed by adjusting the input powers of the first MG unit 29 and the second MG unit 30 (or the first AC motor 13 and the second AC motor 14) as well as the output power of the voltage boosting converter 21 to such values that the difference ΔVs between the target value Vs* and detected value Vsf of the system voltage is reduced. Thus, even when balance of power between the AC motor 13 and the second AC motor 14 changes considerably due to a change in vehicle operating state or another cause, the system voltage can be stabilized effectively. In addition, the effect of the stabilization of the voltage appearing on the power supply line 22 can be enhanced without using a voltage boosting converter having high performance and without employing a smoothing capacitor having a large capacitance. Thus, demands for a compact system and a low cost can be met.

Either one or both of the first MG unit 29 and the second MG unit 30 as well as the voltage boosting converter 21 are selected by using information on the first MG unit 29, the second MG unit 30 and the voltage boosting converter 21 in addition to information on the vehicle as information on the operating state of the electric vehicle. Further the selection is made based on the fact that the upper limits of the input power operation quantities of the first MG unit 29 and the second MG unit 30 as well as the upper limit of the output power operation quantity of the voltage boosting converter 21 vary, because the driving and power generation states of the first MG unit 29 and the second MG unit 30 as well as the driving state of the voltage boosting converter 21 change in accordance with the operating state of the electric vehicle. Thus, it is possible to select one or both the first MG unit 29 and the second MG unit 30 and/or the voltage boosting converter 21, by which the target input power operation quantity Pm* required for stabilization of the system voltage can be realized. Then, by executing the control to stabilize the system voltage on one selected MG unit or the voltage boosting converter 21 or, as an alternative, by letting the two or more selected MG units and the voltage boosting converter 21 share the control load of the control to stabilize the system voltage, the target input power operation quantity Pm* required for stabilization of the system voltage can be realized certainly. As a result, the system voltage stabilization function can be executed fully without being affected by the operating state of the electric vehicle.

In the process to select the first MG unit 29, the second MG unit 30 and the voltage boosting converter 21 for high frequency variations in the system voltage, priority is given to the first MG unit 29 and the second MG unit 30 each preferred to serve as an object of the control to stabilize the system voltage, since the first MG unit 29 and the second MG unit 30 are both suitable for suppression of high frequency variations in the system voltage. Thus, high frequency variations in the system voltage can be suppressed effectively. For low frequency variations in the system voltage, on the other hand, priority is given to the voltage boosting converter 21 preferred to serve as an object of the control to stabilize the system voltage since the voltage boosting converter 21 is suitable for suppression of low frequency variations in the system voltage. Thus, low frequency variations in the system voltage can also be suppressed effectively as well.

In addition, the first upper limit value Pm1(max) of the first MG unit 29 is determined on the basis of a present torque command value T1* and present rotation speed N1 of the first AC motor 13. In the same way, the second upper limit value Pm2(max) of the second MG unit 30 is determined on the basis of the present torque command value T2* and present rotation speed N2 of the second AC motor 14. Similarly, the conduction duty ratio Dc of the voltage boosting converter 21, the voltage V20 and the charge condition C20 of the DC power supply 20 are used in a process to compute the upper limit value Pmc(max) of the voltage boosting converter 21. Then, the upper limit value Pmc(max) of the voltage boosting converter 21 is compared with the target input power operation quantity Pm* to produce a result of determination as to whether or not the upper limit value Pmc(max) is greater than the target input power operation quantity Pm*. In addition, the first limit value Pm1(max) of the first MG unit 29 and the second limit value Pm2(max) of the second MG unit 30 are also compared with the target input power operation quantity Pm* to produce a result of determination as to whether or not the first limit value Pm1(max) and/or the second limit value Pm2(max) are greater than the target input power operation quantity Pm*. Then, the first MG unit 29, the second MG unit 30 and/or the voltage boosting converter 21 are each selected as an object of the control to stabilize the system voltage on the basis of results of the determinations. Thus, the first MG unit 29, the second MG unit 30 and/or the voltage boosting converter 21 are so selected that the target input power operation quantity Pm* required for stabilization of the system voltage can be realized certainly.

The first and second heat margins hc1 and hc2 of the first MG unit 29 and the second MG unit 30 are computed on the basis of the temperatures to and t2 of the AC motors 13 and 14 respectively. Then, the first and second heat margins hc1 and hc2 of the first MG unit 29 and the second MG unit 30 respectively are compared with each other to produce a result of determination as to which of the first and second heat margins hc1 and hc2 is greater. Subsequently, the MG unit having the greater heat margin is selected to as an object of the control to stabilize the system voltage. Thus, it is possible to prevent the MG unit from being over-heated due to the control to stabilize the system voltage.

In addition, in the control system for applying the sinusoidal PWM control method to the first AC motor 13 and the second AC motor 14, the control to stabilize the system voltage is executed by adjusting the current vector to change only a reactive power not contributing anything to each of the first AC motor 13 and the second AC motor 14. In this way, the system voltage is controlled by adjusting the input powers of the first AC motor 13 and the second AC motor 14 while sustaining the torques generated by the first AC motor 13 and the second AC motor 14 at constant values (that is, at torque command values T1* and T2* respectively). As a result, variations in the system voltage can be suppressed without badly affecting the operating state of the vehicle.

It is to be noted that the input powers of the first AC motor 13 and the second AC motor 14 are adjusted by controlling current vectors of the first AC motor 13 and second AC motor 14 while sustaining the torques generated by the first AC motor 13 and the second AC motor 14 at constant values. Instead of adjusting the current vectors, however, the input powers of the first AC motor 13 and the second AC motor 14 can also be adjusted by controlling voltage vectors of the first AC motor 13 and second AC motor 14, while sustaining the torques generated by the first AC motor 13 and the second AC motor 14 at constant values.

Fourth Embodiment

In the case of the third embodiment, the second AC motor 14 is controlled by the sinusoidal PWM control method. In the case of a fourth embodiment, on the other hand, the second AC motor 14 is controlled by the rectangular waveform control method.

Figure 15:
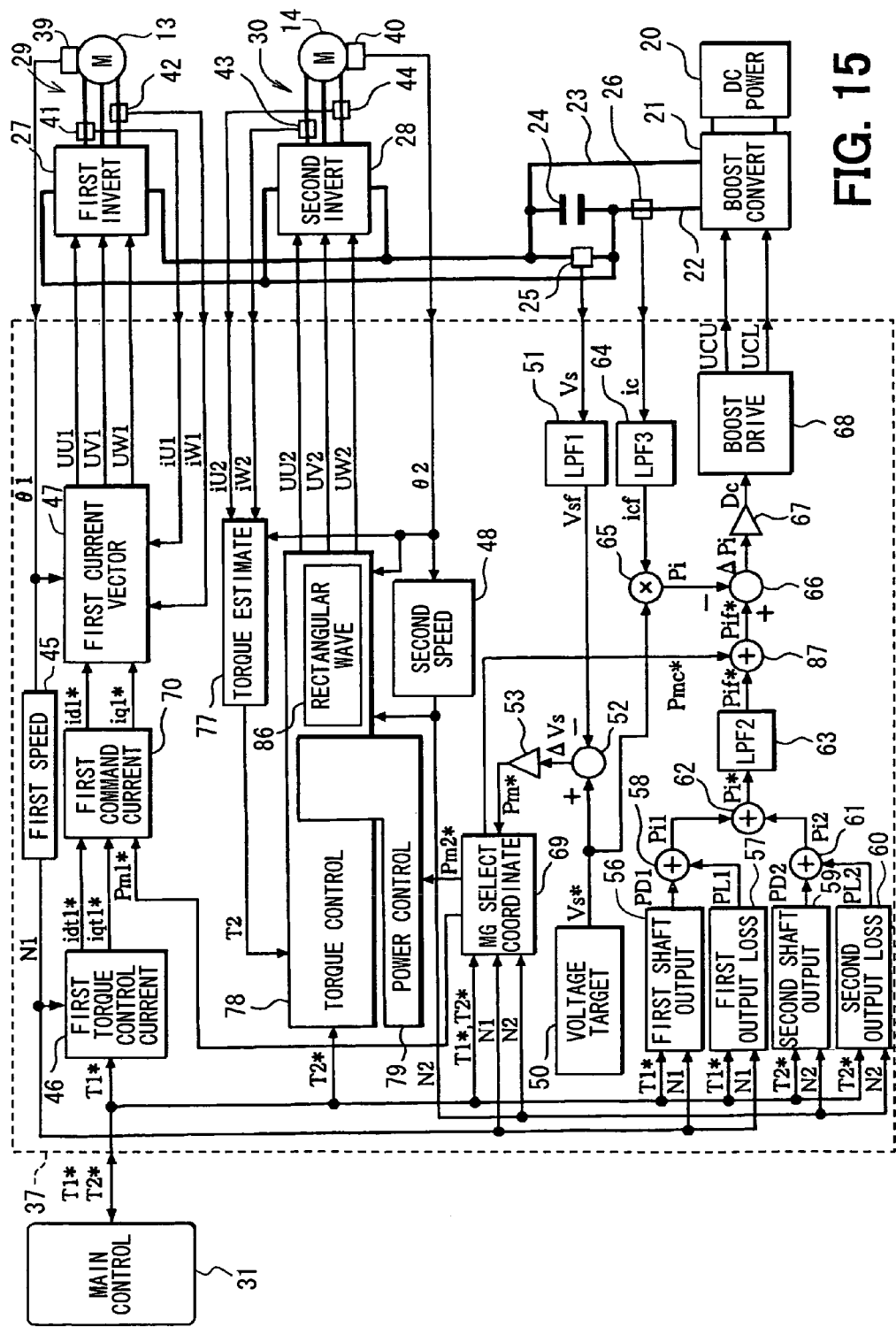
FIG. 15 is a block diagram showing a system for controlling AC motors in accordance with a fourth embodiment of the present invention.

As shown in FIG. 15, in a process to apply torque control to the second AC motor 14, the motor control apparatus 37 adopts the rectangular waveform control method to generate three-phase voltage command signals UU2, UV2 and UW2 on the basis of a torque command value T2* output by the main control unit 31, the U-phase current iU2 and the W-phase current iW2 of the second AC motor 14 as well as the rotor rotational position θ2 of the second AC motor 14. The rectangular waveform control method adopted for the second AC motor 14 is a method of changing electrical conduction of the AC motor 14 every predetermined value of an electrical angle of the AC motor 14.

In controlling the AC motor 14 by the rectangular waveform control method, the duty ratio Duty of the rectangular waveform of the current flowing to the AC motor 14 is changed to vary the pulse width of the rectangular waveform. At the same time, the phase φ of the rectangular waveform is also changed to sustain the torque generated by the second AC motor 14 at a constant value (that is, at the torque command value T2*). Thus, by adjusting the duty ratio Duty and the phase φ, the input power of the second AC motor 14 can be controlled so as to suppress variations in the system voltage while sustaining the torque generated by the second AC motor 14 at a constant value (that is, at the torque command value T2*).

Specifically, the signal output by the rotor rotational position sensor 40 as a signal representing the rotor rotational position θ2 of the second AC motor 14 is supplied to the rotation speed computation unit 48 for computing the rotation speed N2 of the second AC motor 14. At the same time, signals output by the current sensors 44 and 43 as signals representing respectively the U-phase current iU2 and W-phase current iW2 of the second AC motor 14 as well as the signal representing the rotor rotational position θ2 of the second AC motor 14 are supplied to the torque estimation unit 77 for estimating the torque T2 generated by the current flowing to the second AC motor 14.

Then, as described with reference to FIG. 8, the subtractor 80 of the torque control unit 78 computes the difference ΔT2 between the torque command value T2* of the second AC motor 14 and the estimated value T2, supplying the difference ΔT2 to the P-I controller 81. The P-I controller 81 executes P-I control to adjust the phase φt of the rectangular waveform so that the phase φt reduces the difference ΔT2 between the torque command value T2* and the estimated value T2. In the mean time, the duty computation unit 82 computes the duty ratio Dt of the rectangular waveform on the basis of the torque command value T2* and rotation speed N2 of the second AC motor 14 by using typically map data or a mathematical equation.

Then, the second target input power operation quantity Pm2* output by the select coordination control unit 69 as the second target input power operation quantity Pm2* of the second MG unit 30, the estimated torque T2 for the second AC motor 14 and the rotation speed N2 of the second AC motor 14 are supplied to the rectangular waveform operation quantity computation unit 83 in the power control unit 79 (serving as a system voltage control means) to compute the duty ratio operation quantity Dp and phase operation quantity φp of the rectangular waveform as follows. First of all, the duty ratio operation quantity Dp of the rectangular waveform is computed on the basis of the second target input power operation quantity Pm2*, the estimated torque T2 and the rotation speed N2 by using typically map data or a mathematical equation.

To be more specific, the rectangular waveform operation quantity computation unit 83 computes the duty ratio operation quantity Dp that changes the input power of the second AC motor 14 by the second target input power operation quantity Pm2* as shown in FIG. 15. Then, the phase operation quantity φp of the rectangular waveform is computed on the basis of the second target input power operation quantity Pm2*, the estimated torque T2 and the rotation speed N2 by using typically map data or a mathematical equation. To be more specific, the rectangular waveform operation quantity computation unit 83 computes the phase operation quantity φp for the duty ratio operation quantity Dp as the phase operation quantity that suppresses variations of a torque generated by the second AC motor 14 as a result of a duty ratio operation based on the duty ratio operation quantity Dp as shown in FIG. 9.

The rectangular waveform operation quantity computation unit 83 includes a quantity limiting means. The quantity limiting means carries out a guarding process to prevent each of the phase operation quantity φp and the duty ratio operation quantity Dp from exceeding the predetermined limit value. To be more specific, the limiting means prevents each of the phase operation quantity φp and the duty ratio operation quantity Dp from increasing to an excessively large value greater than the predetermined limit value.

It is to be noted that, in the processing to compute the phase operation quantity φp and the duty ratio operation quantity Dp, the torque command value T2* can be used as a substitute for the estimated torque T2. In addition, the rectangular waveform operation quantity computation unit 83 may also compute a phase operation quantity φp on the basis of a final duty ratio Duty (=Dt+Dp) to be described later and the torque command value T2* as the phase operation quantity φp suppressing torque variations generated by the second AC motor 14 as a result of the duty ratio operation based on the duty ratio.

Then, the adder 84 in the power control unit 79 adds the phase operation quantity φp to the phase φt of the rectangular waveform to produce the final phase φ (=φt+φp) of the rectangular waveform. At the same time, the adder 85 also in the power control unit 79 adds the duty ratio operation quantity Dp to the duty ratio Dt of the rectangular waveform to produce a final duty ratio Duty (=Dt+Dp) of the rectangular waveform. Then, the rectangular waveform computation unit 86 in the torque control unit 78 computes three-phase voltage command signals UU2, UV2 and UW2 (also referred to as rectangular waveform command signals) on the basis of the final phase φ of the rectangular waveform, the final duty ratio Duty of the rectangular waveform, the rotor rotational position θ2 of the second AC motor 14 and the rotation speed N2 of the second AC motor 14, outputting the three-phase voltage command signals UU2, UV2 and UW2 to the three-phase second inverter 28.

In this way, the torque control to control the torque generated by the second AC motor 14 is executed to implement the torque command value T2* output by the main control apparatus 31 and, at the same time, the system voltage stabilization control is executed by adjusting the input power of the second MG unit 30 (or the second AC motor 14) to suppress variations in the system voltage by reducing the difference ΔVs between the target value Vs* and detected value Vsf of the system voltage while sustaining the torque generated by the second AC motor 14 at a constant value (that is, at the torque command value T2*).

In addition, much like the third embodiment, the motor control apparatus 37 selects either one or both of the first MG unit 29 and the second MG unit 30 as well as the voltage boosting converter 21 each to serve as an object of the control to stabilize the system voltage by using information on the first MG unit 29, the second MG unit 30 and the voltage boosting converter 21 in addition to information on the vehicle as information on the operating state of the electric vehicle.

Also in the case of the fourth embodiment, either one or both of the first MG unit 29 and the second MG unit 30 as well as the voltage boosting converter 21 are selected each to serve as an object of the control to stabilize the system voltage by using information on the first MG unit 29, the second MG unit 30 and the voltage boosting converter 21 in addition to information on the vehicle as information on the operating state of the electric vehicle. Thus, either one or both of the first MG unit 29 and the second MG unit 30 as well as the voltage boosting converter 21 are so selected each to serve as an object of the control to stabilize the system voltage that the target input power operation quantity Pm* required for stabilization of the system voltage can be realized certainly. Then, by executing the control to stabilize the system voltage on one selected MG unit or the voltage boosting converter 21 or, as an alternative, by letting the two or more selected MG units and the voltage boosting converter 21 share the control load of the control to stabilize the system voltage, the target input power operation quantity Pm* required for stabilization of the system voltage can be realized certainly. As a result, the system voltage stabilization function can be executed fully without being affected by the operating state of the electric vehicle.

In addition, in execution of the control to stabilize the system voltage in the system for controlling the second AC motor 14 by the rectangular waveform control method, the rectangular waveform operation quantity computation unit 83 computes the duty ratio operation quantity Dp that changes the input power of the second AC motor 14 by the second target input power operation quantity Pm2*. Then, the rectangular waveform operation quantity computation unit 83 computes the phase operation quantity φp for the duty ratio operation quantity Dp as the phase operation quantity that suppresses variations of a torque generated by the second AC motor 14 as a result of the duty ratio operation based on the duty ratio operation quantity Dp. Thus, the control of stabilizing the system voltage can be executed by adjusting the input power of the second AC motor 14 to suppress variations in the system voltage while sustaining the torque generated by the second AC motor 14 at a constant value (that is, at the torque command value T2*). As a result, variations in the system voltage can be suppressed without badly affecting the operating state of the vehicle.

It is to be noted that, in the case of the third and fourth embodiments, the input power operation quantity upper limit of the first MG unit 29 is determined on the basis of the torque command value and rotation speed of the first AC motor 13. Similarly, the input power operation quantity upper limit of the second MG unit 30 is determined on the basis of the torque command value and rotation speed of the second AC motor 14. However, the determination of the input power operation quantity upper limits is by no means limited to this method. For example, the input power operation quantity upper limits of the first MG unit 29 and the second MG unit 30 can also be determined on the basis of information on the first MG unit 29 and the second MG unit 30 respectively. The information on the first MG unit 29 is typically at least one of the torque, rotation speed and input power of the first AC motor 13 and, similarly, the information on the second MG unit 30 is typically at least one of the torque, rotation speed and input power of the second AC motor 14. As an alternative, the input power operation quantity upper limits of the first MG unit 29 and the second MG unit 30 can also be determined on the basis of information on the electric vehicle. The information on the electric vehicle is typically at least one of the speed of the vehicle and the torque generated by the vehicle.

In addition, the information used for determining the first limit value Pm1(max) of the first MG unit 29 and the second limit value Pm2(max) of the second MG unit 30 may be properly changed. Similarly, the information used for determining the upper limit value Pmc(max) of the voltage boosting converter 21 may be properly changed as well.

Since the voltage boosting converter 21 has a greater capability of supplying power to the power supply line 22 than the first MG unit 29 and the second MG unit 30 do, the first limit value Pm1(max) of the first MG unit 29, the second limit value Pm2(max) of the second MG unit 30 and the upper limit value Pmc(max) of the voltage boosting converter 21 can be set at such values that the voltage boosting converter 21 is allowed to supply more power to the power supply line 22 than the first MG unit 29 and the second MG unit 30 are.

Furthermore, the conversion power control is executed so as to reduce the difference ΔPi between the command value Pi* of the power, which is output by the voltage boosting converter 21 as the power referred to as the output power, and the detected value Pi of the output power. However, the conversion power control can also be executed so as to reduce the difference ΔPi between the command value Pi* of the power, which is input by the voltage boosting converter 21 as the power referred to as the input power, and the detected value Pi of the input power.

The first to fourth embodiments are directed to a hybrid vehicle of a split type of splitting the power of the engine by using a planet-gear set is discussed. However, the embodiments may be directed to a hybrid vehicle adopting another method such as a parallel type of a series type. Moreover, the embodiments are directed to a vehicle using AC motors and an engine as power sources. However, the embodiments may be applied to a vehicle employing only AC motors as a power source. In addition, the embodiments may also be directed to a vehicle employing three or more MG units each comprising an inverter and an AC motor.

What is claimed is:

1. A control apparatus for an electric vehicle comprising:
a voltage conversion means for converting a voltage generated by a DC power supply into a system voltage appearing on a power supply line;
a plurality of MG units as motor driving units, each including an inverter connected to the power supply line and an AC motor driven by the inverter;
an MG-unit select means for selecting at least one of the MG units in accordance with operating state of the electric vehicle; and
a system voltage control means for executing system voltage stabilization control to suppress variations in the system voltage by controlling input powers of the least one selected MG unit.

2. The control apparatus in accordance with claim 1,
wherein the MG-unit select means uses information, as information on operating state of the electric vehicle, on the electric vehicle and/or information on the MG units to select an MG unit to serve as an object of the system voltage stabilization control.

3. The control apparatus in accordance with claim 2,
wherein the MG-unit select means uses, as the information on the electric vehicle, at least one of speed of the electric vehicle and an output shaft torque of the electric vehicle.

4. The control apparatus in accordance with claim 2,
wherein the MG-unit select means uses, as the information on any one of the MG units, at least one of torque, rotation speed and input power of the AC motor of the MG unit.

5. The control apparatus in accordance with claim 2,
wherein the MG-unit select means uses, as the information on any one of the MG units, temperature of the AC motor of the MG unit.

6. The control apparatus in accordance with claim 1,
wherein the system voltage control means controls the system voltage by adjusting an input power different from a power required in generation of a torque in any one of the AC motors.

7. The control apparatus in accordance with claim 6 further comprising:
a motor control means for controlling any one of the AC motors by a sinusoidal PWM control method,
wherein the system voltage control means controls the input power of the any one of the AC motors of the MG units through adjustment of a current vector of a current flowing to the any one of the AC motors or adjustment of a voltage vector of a voltage applied to the any one of the AC motors by the sinusoidal PWM control method.

8. The control apparatus in accordance with claim 6, further comprising:
a motor control means for controlling any one of the AC motors by a rectangular waveform control method,
wherein the system voltage control means controls the input power of the MG unit including the any one of the AC motors through adjustment of the duty cycle and/or phase of a waveform representing electrical conduction of the any one of the AC motors by the rectangular waveform control method.

9. The control apparatus in accordance with claim 1, the control apparatus further comprising:
a target voltage setting means for setting a target value of the system voltage;
a voltage detection means for detecting the system voltage; and
a power operation quantity computation means for computing an operation quantity of the power input of the any one of the MG units on the basis of a value set by the target voltage setting means as the target value of the system voltage and a value detected by the voltage detection means as a detected value of the system voltage,
wherein the system voltage control means controls the system voltage by adjusting the input power of the any one of the MG units on the basis of a quantity computed by the power operation quantity computation means as an operation quantity of the power input of the specific MG unit.

10. The control apparatus in accordance with claim 1,
wherein the AC motor is driven electrically by the inverter or mechanically by an engine of the vehicle.

11. The control apparatus is accordance with claim 1, further comprising:
a smoothing capacitor connected to the power supply line for smoothing the system voltage separately from the system voltage control means.

12. A method of controlling an electric vehicle, the method comprising:
converting a voltage generated by a DC power supply into a system voltage appearing on a power supply line;
selecting at least one of a plurality of MG units as motor driving units in accordance with an operating state of the electric vehicle, each of the MG units including an inverter connected to the power supply line and an AC motor driven by the inverter; and executing system voltage stabilization control to suppress variations in the system voltage by controlling input power of the at least one selected MG unit.

13. The method in accordance with claim 12, wherein the selecting uses information on operating state of the electric vehicle, on the electric vehicle and/or information on the MG units to select an MG unit to serve as an object of the system voltage stabilization control.

14. The method in accordance with claim 13, wherein the selecting uses, as the information on the electric vehicle, at least one of speed of the electric vehicle and an output shaft torque of the electric vehicle.

15. The method in accordance with claim 13, wherein the selecting uses, as the information on any one of the MG units, at least one of torque, rotation speed and input power of the AC motor of the MG unit.

16. The method in accordance with claim 13, wherein the selecting uses, as the information on any one of the MG units, temperature of the AC motor of the MG unit.

17. The method in accordance with claim 12, wherein executing system voltage stabilization control includes controlling the system voltage by adjusting an input power different from a power required in generation of a torque in any one of the AC motors.

18. The method in accordance with claim 17 further comprising:

controlling any one of the AC motors by a sinusoidal PWM control method, wherein executing system voltage stabilization control includes controlling the input power of the any one of the AC motors of the MG units through adjustment of a current vector of a current flowing to the any one of the AC motors or adjustment of a voltage vector of a voltage applied to the any one of the AC motors by the sinusoidal PWM control method.

19. The method in accordance with claim 17, further comprising:

controlling any one of the AC motors by a rectangular waveform control method, wherein executing system voltage stabilization control includes controlling the input power of the MG unit including the any one of the AC motors through adjustment of the duty cycle and/or phase of a waveform representing electrical conduction of the any one of the AC motors by the rectangular waveform control method.

20. The method in accordance with claim 12, further comprising:

setting a target value of the system voltage;

detecting the system voltage; and computing an operation quantity of the power input of the any one of the MG units on the basis of a value set as the target value of the system voltage and a value detected as a detected value of the system voltage, wherein executing system voltage stabilization control includes controlling the system voltage by adjusting the input power of the any one of the MG units on the basis of a quantity computed by the power operation quantity computation unit as an operation quantity of the power input of the specific MG unit.

21. The method in accordance with claim 12, wherein the AC motor is driven electrically by the inverter or mechanically by an engine of the vehicle.

22. The method in accordance with claim 12, further comprising:

smoothing, via a smoothing capacitor connected to the power supply line, the system voltage separately from the executing system voltage stabilization control.

23. The control apparatus in accordance with claim 1, wherein the system voltage control means detects a difference between a target value and an actual value of the system voltage and controls the input power of the selected MG unit based on the difference in a direction to reduce the difference.

24. The control apparatus in accordance with claim 23, wherein the system voltage control means adjusts a current supplied to the selected MG unit based on the difference.

25. The control apparatus in accordance with claim 24, wherein the system voltage control means corrects a command current, which is set in accordance with a target torque required to by produced, based on the difference.

26. The method in accordance with claim 12, wherein a difference between a target value and an actual value of the system voltage is detected and the input power of the selected MG unit is controlled based on the difference in a direction to reduce the difference.

27. The method in accordance with claim 26, wherein a current supplied to the selected MG unit is adjusted based on the difference.

28. The method in accordance with claim 27.

wherein a command current, which is set in accordance with a target torque required to be produced, is corrected based on the difference.

\* \* \* \* \*